US009245244B2

(12) United States Patent
Thomas et al.

(10) Patent No.: US 9,245,244 B2
(45) Date of Patent: *Jan. 26, 2016

(54) SYSTEM AND METHOD FOR ENABLING PRODUCT DEVELOPMENT

(75) Inventors: Tracey R. Thomas, New York, NY (US); Katherine G. Chen, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 12/862,912

(22) Filed: Aug. 25, 2010

(65) Prior Publication Data
US 2011/0154217 A1    Jun. 23, 2011

Related U.S. Application Data

(63) Continuation-in-part of application No. 12/640,550, filed on Dec. 17, 2009.

(51) Int. Cl.
G06Q 10/06 (2012.01)
G06Q 30/02 (2012.01)
G06Q 30/06 (2012.01)
G06Q 30/08 (2012.01)

(52) U.S. Cl.
CPC ........ G06Q 10/06 (2013.01); G06Q 10/063112 (2013.01); G06Q 30/0282 (2013.01); G06Q 30/0601 (2013.01); G06Q 30/08 (2013.01)

(58) Field of Classification Search
CPC ...................................... G06Q 10/06
USPC .......... 709/229; 705/7.14, 7.15, 14.44, 14.66, 705/342, 343
See application file for complete search history.

(56) References Cited

U.S. PATENT DOCUMENTS

| | | | |
|---|---|---|---|
| 5,206,933 A | 4/1993 | Farrell et al. | |
| 5,704,029 A | 12/1997 | Wright | |
| 5,842,195 A | 11/1998 | Peters et al. | |
| 5,999,907 A | 12/1999 | Donner | |
| 6,167,383 A * | 12/2000 | Henson ........................ | 705/26.5 |
| 6,216,170 B1 | 4/2001 | Giovannoni et al. | |
| 6,282,548 B1 | 8/2001 | Burner et al. | |
| 6,332,129 B1 | 12/2001 | Walker et al. | |

(Continued)

FOREIGN PATENT DOCUMENTS

WO    2007059156    5/2007
WO    2008130397    10/2008

OTHER PUBLICATIONS

USPTO; Final Office Action dated Feb. 21, 2012 in U.S. Appl. No. 12/640,955.

(Continued)

Primary Examiner — Asghar Bilgrami
(74) Attorney, Agent, or Firm — Snell & Wilmer L.L.P.

(57) ABSTRACT

A comprehensive platform for developing digital products. A standardized process is applied to a product development effort and an online portal provides tools to aid the product development, assessment, funding and commercializing products. Project management, workflow and data security functionality enable consistent, efficient and secure interactions between users. Business rules, workflows, valuation models and rating methods may be user defined or based upon marketplace, industry or technology standards.

20 Claims, 4 Drawing Sheets

(56) References Cited

U.S. PATENT DOCUMENTS

| | | |
|---|---|---|
| 6,556,992 B1 | 4/2003 | Barney et al. |
| 6,839,680 B1 | 1/2005 | Liu et al. |
| 6,853,978 B2 * | 2/2005 | Forth et al. .................. 705/26.5 |
| 6,859,784 B1 * | 2/2005 | van Duyne et al. .......... 705/7.32 |
| 7,080,117 B2 | 7/2006 | de Pinto et al. |
| 7,099,849 B1 | 8/2006 | Reeder et al. |
| 7,188,069 B2 | 3/2007 | Hagelin |
| 7,236,976 B2 | 6/2007 | Breitenbach et al. |
| 7,249,045 B2 | 7/2007 | Lauffer |
| 7,257,548 B2 | 8/2007 | Hathaway et al. |
| 7,272,572 B1 | 9/2007 | Pienkos |
| 7,346,518 B1 | 3/2008 | Frank et al. |
| 7,461,406 B2 | 12/2008 | Pelly et al. |
| 7,464,073 B2 | 12/2008 | Stevens et al. |
| 7,523,045 B1 | 4/2009 | Walker et al. |
| 7,552,134 B2 | 6/2009 | Norton et al. |
| 7,609,832 B2 * | 10/2009 | Kreiner et al. ........... 379/265.02 |
| 7,627,486 B2 | 12/2009 | Musgrove et al. |
| 7,634,415 B2 | 12/2009 | Baker et al. |
| 7,653,551 B2 | 1/2010 | Poltorak |
| 7,668,913 B1 | 2/2010 | Underwood et al. |
| 7,676,375 B1 | 3/2010 | Neifeld et al. |
| 7,716,581 B2 | 5/2010 | Tran |
| 7,747,537 B2 | 6/2010 | Grim et al. |
| 7,765,309 B2 | 7/2010 | Spearman et al. |
| 7,778,980 B2 | 8/2010 | Bodin et al. |
| 7,801,830 B1 | 9/2010 | Frank et al. |
| 7,801,847 B2 | 9/2010 | Kilerich et al. |
| 7,805,345 B2 | 9/2010 | Abrahams et al. |
| 7,849,135 B2 | 12/2010 | Agrawal et al. |
| 7,856,414 B2 | 12/2010 | Zee |
| 7,941,468 B2 | 5/2011 | Zellner et al. |
| 7,949,728 B2 | 5/2011 | Rivette et al. |
| 7,987,477 B2 | 7/2011 | Maynard et al. |
| 7,992,128 B2 | 8/2011 | Hammerich et al. |
| 7,996,754 B2 | 8/2011 | Bodin et al. |
| 8,265,942 B2 * | 9/2012 | Doyle et al. .................... 705/1.1 |
| 8,321,321 B2 | 11/2012 | Jagarlapudi |
| 8,326,851 B2 | 12/2012 | Grune et al. |
| 8,386,623 B2 | 2/2013 | Thomas |
| 2001/0037258 A1 | 11/2001 | Barritz et al. |
| 2001/0049707 A1 | 12/2001 | Tran |
| 2002/0002523 A1 | 1/2002 | Kossovsky et al. |
| 2002/0002524 A1 | 1/2002 | Kossovsky et al. |
| 2002/0016727 A1 | 2/2002 | Harrell et al. |
| 2002/0077835 A1 | 6/2002 | Hagelin |
| 2002/0082973 A1 | 6/2002 | Marbach et al. |
| 2002/0091541 A1 | 7/2002 | Lundberg |
| 2002/0095368 A1 | 7/2002 | Tran |
| 2002/0103654 A1 | 8/2002 | Poltorak |
| 2002/0103689 A1 | 8/2002 | Hornick et al. |
| 2002/0111824 A1 | 8/2002 | Grainger |
| 2002/0178029 A1 | 11/2002 | Nutter |
| 2002/0179029 A1 | 12/2002 | Watson |
| 2002/0184044 A1 | 12/2002 | Reader |
| 2003/0004936 A1 | 1/2003 | Grune et al. |
| 2003/0036942 A1 | 2/2003 | Wescott |
| 2003/0036945 A1 | 2/2003 | Del Vecchio et al. |
| 2003/0046307 A1 | 3/2003 | Rivette et al. |
| 2003/0061133 A1 | 3/2003 | Nutter et al. |
| 2003/0065642 A1 | 4/2003 | Zee |
| 2003/0083961 A1 | 5/2003 | Bezos et al. |
| 2003/0182290 A1 | 9/2003 | Parker |
| 2003/0212572 A1 | 11/2003 | Poltorak |
| 2003/0216928 A1 | 11/2003 | Shour |
| 2003/0216938 A1 | 11/2003 | Shour |
| 2004/0030653 A1 | 2/2004 | Christensen |
| 2004/0049482 A1 | 3/2004 | Brechter et al. |
| 2004/0068453 A1 | 4/2004 | Duan et al. |
| 2004/0113938 A1 | 6/2004 | Akerfeldt |
| 2004/0186738 A1 | 9/2004 | Reisman |
| 2004/0205537 A1 | 10/2004 | Graham et al. |
| 2004/0220935 A1 * | 11/2004 | McGraw et al. ................ 707/10 |
| 2005/0027800 A1 | 2/2005 | Erickson et al. |
| 2005/0071174 A1 | 3/2005 | Leibowitz |
| 2005/0086587 A1 * | 4/2005 | Balz .............................. 715/505 |
| 2005/0102696 A1 | 5/2005 | Westberg |
| 2005/0182755 A1 | 8/2005 | Tran |
| 2005/0210008 A1 | 9/2005 | Tran et al. |
| 2005/0228684 A1 | 10/2005 | Pogodin et al. |
| 2005/0243726 A1 | 11/2005 | Narendran et al. |
| 2005/0261927 A1 | 11/2005 | Bilak et al. |
| 2006/0036452 A1 | 2/2006 | Williams |
| 2006/0085360 A1 | 4/2006 | Grim et al. |
| 2006/0100948 A1 | 5/2006 | Millien et al. |
| 2006/0105312 A1 * | 5/2006 | McClimon et al. ........... 434/350 |
| 2006/0155572 A1 | 7/2006 | Postrel |
| 2006/0190446 A1 | 8/2006 | Lee et al. |
| 2006/0218101 A1 | 9/2006 | Kim |
| 2006/0247934 A1 | 11/2006 | Umehara et al. |
| 2006/0259315 A1 | 11/2006 | Malackowski et al. |
| 2007/0010195 A1 | 1/2007 | Brown et al. |
| 2007/0022003 A1 | 1/2007 | Chao et al. |
| 2007/0028259 A1 | 2/2007 | Lee et al. |
| 2007/0073625 A1 | 3/2007 | Shelton |
| 2007/0073626 A1 | 3/2007 | Reeder et al. |
| 2007/0118485 A1 | 5/2007 | Gugerbauer |
| 2007/0136206 A1 | 6/2007 | Kwok |
| 2007/0150298 A1 | 6/2007 | Barney |
| 2007/0186230 A1 | 8/2007 | Foroutan |
| 2007/0192684 A1 | 8/2007 | Bodin et al. |
| 2007/0204287 A1 | 8/2007 | Conradt et al. |
| 2007/0208669 A1 | 9/2007 | Rivette et al. |
| 2007/0208719 A1 | 9/2007 | Tran |
| 2007/0219817 A1 | 9/2007 | Wu |
| 2007/0226238 A1 | 9/2007 | Kilerich et al. |
| 2007/0239556 A1 | 10/2007 | Wagner et al. |
| 2007/0260549 A1 | 11/2007 | Walker |
| 2007/0266401 A1 | 11/2007 | Hallberg |
| 2007/0276866 A1 | 11/2007 | Bodin et al. |
| 2007/0282879 A1 | 12/2007 | Degenkolb et al. |
| 2007/0294127 A1 | 12/2007 | Zivov |
| 2008/0059485 A1 | 3/2008 | Finn |
| 2008/0086316 A1 | 4/2008 | Frank et al. |
| 2008/0140786 A1 | 6/2008 | Tran |
| 2008/0195547 A1 | 8/2008 | Boyer et al. |
| 2008/0201159 A1 | 8/2008 | Gabrick et al. |
| 2008/0201211 A1 | 8/2008 | Frank et al. |
| 2008/0215377 A1 | 9/2008 | Wottowa et al. |
| 2008/0215474 A1 | 9/2008 | Graham |
| 2008/0243642 A1 | 10/2008 | Ramer |
| 2008/0244020 A1 | 10/2008 | Dolan |
| 2009/0023393 A1 | 1/2009 | Behzad et al. |
| 2009/0024486 A1 | 1/2009 | Sevrain |
| 2009/0024534 A1 | 1/2009 | Sevrain |
| 2009/0043609 A1 | 2/2009 | Nadas et al. |
| 2009/0077589 A1 | 3/2009 | Boyer et al. |
| 2009/0097657 A1 | 4/2009 | Scheidt et al. |
| 2009/0144172 A1 | 6/2009 | Frederick et al. |
| 2009/0171858 A1 | 7/2009 | Kwitek |
| 2009/0187485 A1 | 7/2009 | Loui et al. |
| 2009/0225764 A1 | 9/2009 | Flores et al. |
| 2009/0228387 A1 | 9/2009 | Johnson et al. |
| 2009/0228476 A1 | 9/2009 | Luther |
| 2009/0245603 A1 * | 10/2009 | Koruga et al. ................. 382/128 |
| 2009/0271274 A1 | 10/2009 | Baunauch |
| 2009/0288118 A1 | 11/2009 | Chang |
| 2009/0307004 A1 | 12/2009 | Quinn |
| 2009/0307577 A1 | 12/2009 | Lee |
| 2009/0318077 A1 | 12/2009 | Ghahramani |
| 2010/0023386 A1 | 1/2010 | Avisar et al. |
| 2010/0023424 A1 | 1/2010 | Sevrain |
| 2010/0030680 A1 | 2/2010 | Malackowski et al. |
| 2010/0088244 A1 | 4/2010 | Frank et al. |
| 2010/0106533 A1 * | 4/2010 | Alvarez ............................. 705/4 |
| 2010/0115566 A1 | 5/2010 | Haimi-Cohen |
| 2010/0146125 A1 | 6/2010 | Su |
| 2010/0151818 A1 | 6/2010 | Miller et al. |
| 2010/0153282 A1 | 6/2010 | Graham |
| 2011/0066503 A1 | 3/2011 | Kanapur et al. |
| 2011/0078157 A1 | 3/2011 | Sun et al. |
| 2011/0093353 A1 | 4/2011 | Nutter et al. |
| 2011/0153434 A1 | 6/2011 | Thomas |
| 2011/0153444 A1 | 6/2011 | Thomas |

(56) References Cited

U.S. PATENT DOCUMENTS

| | | | |
|---|---|---|---|
| 2011/0153447 | A1 | 6/2011 | Thomas |
| 2011/0153455 | A1 | 6/2011 | Thomas |
| 2011/0153473 | A1 | 6/2011 | Thomas |
| 2011/0153517 | A1 | 6/2011 | Thomas |
| 2011/0153518 | A1 | 6/2011 | Thomas |
| 2011/0153552 | A1 | 6/2011 | Thomas |
| 2011/0153573 | A1 | 6/2011 | Thomas |
| 2011/0153851 | A1 | 6/2011 | Thomas |
| 2011/0153852 | A1 | 6/2011 | Thomas |
| 2011/0154451 | A1 | 6/2011 | Thomas |
| 2011/0154476 | A1 | 6/2011 | Thomas |
| 2011/0161089 | A1 | 6/2011 | Kuan et al. |
| 2011/0184871 | A1 | 7/2011 | Stahl |
| 2011/0246326 | A1 | 10/2011 | Thomas |
| 2011/0282738 | A1 | 11/2011 | Thomas |
| 2011/0282754 | A1 | 11/2011 | Thomas |
| 2011/0282761 | A1 | 11/2011 | Thomas |
| 2011/0282762 | A1 | 11/2011 | Thomas |
| 2011/0282765 | A1 | 11/2011 | Thomas |
| 2011/0282766 | A1 | 11/2011 | Thomas |
| 2011/0282796 | A1 | 11/2011 | Thomas |
| 2011/0282797 | A1 | 11/2011 | Thomas |
| 2011/0288957 | A1 | 11/2011 | Thomas |
| 2011/0288984 | A1 | 11/2011 | Thomas |
| 2011/0288985 | A1 | 11/2011 | Thomas |
| 2012/0011028 | A1 | 1/2012 | Thomas |
| 2012/0011029 | A1 | 1/2012 | Thomas |
| 2012/0011030 | A1 | 1/2012 | Thomas |
| 2012/0011032 | A1 | 1/2012 | Thomas |
| 2012/0011034 | A1 | 1/2012 | Thomas |
| 2012/0016765 | A1 | 1/2012 | Thomas |
| 2012/0016767 | A1 | 1/2012 | Thomas |
| 2012/0016769 | A1 | 1/2012 | Thomas |
| 2012/0016770 | A1 | 1/2012 | Thomas |
| 2012/0016771 | A1 | 1/2012 | Thomas |
| 2012/0047533 | A1 | 2/2012 | Westberg |
| 2012/0078700 | A1 | 3/2012 | Pugliese et al. |
| 2012/0296841 | A1 | 11/2012 | Musgrove et al. |
| 2012/0317040 | A1 | 12/2012 | Shaffer |
| 2012/0317041 | A1 | 12/2012 | Shaffer et al. |

OTHER PUBLICATIONS

USPTO; Office Action dated Mar. 21, 2012 in U.S. Appl. No. 12/640,932.
USPTO; Office Action dated Mar. 22, 2012 in U.S. Appl. No. 12/640,716.
USPTO; Office Action dated Mar. 27, 2012 in U.S. Appl. No. 12/640,790.
USPTO; Advisory Action dated Apr. 19, 2012 in U.S. Appl. No. 12/640,955.
USPTO; Office Action dated May 10, 2012 in U.S. Appl. No. 12/868,140.
International Preliminary Report on Patentability dated May 23, 2012 in PCT/US2010/052587.
USPTO; Final Office Action dated May 17, 2012 in U.S. Appl. No. 12/640,837.
USPTO; Final Office Action dated Jun. 28, 2012 in U.S. Appl. No. 12/640,550.
USPTO; Advisory Action dated Sep. 2, 2011 in U.S. Appl. No. 12/640,661.
USPTO; Office Action dated Sep. 19, 2011 in U.S. Appl. No. 12/640,955.
Office Action dated Feb. 4, 2011 in U.S. Appl. No. 12/640,661.
Office Action dated Nov. 24, 2010 in U.S. Appl. No. 12/868,158.
International Search Report and Written Opinion dated Dec. 9, 2010 in Application No. PCT/US2010/052652.
International Search Report and Written Opinion dated Dec. 9, 2010 in Application No. PCT/US2010/052605.
International Search Report and Written Opinion dated Dec. 9, 2010 in Application No. PCT/US2010/052587.
USPTO; Final Office Action dated Jun. 17, 2011 in U.S. Appl. No. 12/640,661.
USPTO; Office Action dated Jun. 28, 2011 in U.S. Appl. No. 12/640,716.
USPTO; Notice of Allowance dated Jul. 1, 2011 in U.S. Appl. No. 12/868,158.
USPTO; Notice of Allowance dated Jul. 18, 2011 in U.S. Appl. No. 12/868,158.
An Examination of the Effects of Participation in a College Study Abroad Program; The Pennsylvania State University; DAI-A 69/11, May 2009; Dissertation; http://proquest.umi.com/pdqweb?did=1629572721&sid=4&Fmt=2&clientId=19649&RQT=309&Vname-PQD.
USPTO; Notice of Allowance dated Jan. 10, 2013 in U.S. Appl. No. 13/194,868.
USPTO; Advisory Action dated Jan. 10, 2013 in U.S. Appl. No. 12/868,140.
USPTO; Advisory Action dated Jan. 17, 2013 in U.S. Appl. No. 12/640,790.
USPTO; Advisory Action dated Feb. 5, 2013 in U.S. Appl. No. 12/640,977.
USPTO; Office Action dated Feb. 20, 2013 in U.S. Appl. No. 13/230,218.
USPTO; Final Office Action dated Feb. 22, 2013 in U.S. Appl. No. 12/640,615.
USPTO; Office Action dated Feb. 25, 2013 in U.S. Appl. No. 13/230,179.
USPTO; Office Action dated Mar. 1, 2013 in U.S. Appl. No. 13/194,672.
USPTO; Office Action dated Mar. 4, 2013 in U.S. Appl. No. 13/230,195.
USPTO; Office Action dated Mar. 4, 2013 in U.S. Appl. No. 13/230,259.
USPTO; Office Action dated Mar. 6, 2013 in U.S. Appl. No. 13/230,326.
USPTO; Final Office Action dated Mar. 13, 2013 in U.S. Appl. No. 13/194,726.
International Search Report and Written Opinion dated Mar. 13, 2013 in Application No. PCT/US2012/070457.
USPTO; Final Office Action dated Mar. 20, 2013 in U.S. Appl. No. 12/862,921.
USPTO; Office Action dated Mar. 26, 2013 in U.S. Appl. No. 13/194,258.
USPTO; Office Action dated Mar. 27, 2013 in U.S. Appl. No. 12/640,895.
USPTO; Office Action dated Mar. 28, 2013 in U.S. Appl. No. 13/230,239.
USPTO; Office Action dated Mar. 28, 2013 in U.S. Appl. No. 13/230,282.
USPTO; Office Action Restriction dated Aug. 2, 2012 in U.S. Appl. No. 12/640,615.
USPTO; Final Office Action dated Oct. 5, 2012 in U.S. Appl. No. 12/640,550.
USPTO; Final Office Action dated Aug. 8, 2012 in U.S. Appl. No. 12/640,661.
USPTO; Advisory Action dated Aug. 24, 2012 in U.S. Appl. No. 12/640,550.
USPTO; Final Office Action dated Aug. 31, 2012 in U.S. Appl. No. 12/640,932.
USPTO; Office Action dated Aug. 31, 2012 in U.S. Appl. No. 12/862,930.
USPTO; Notice of Allowance dated Sep. 6, 2012 in U.S. Appl. No. 12/640,716.
USPTO; Final Office Action dated Sep. 18, 2012 in U.S. Appl. No. 12/640,895.
USPTO; Office Action dated Sep. 26, 2012 in U.S. Appl. No. 12/862,921.
USPTO; Advisory Action dated Jul. 19, 2012 in U.S. Appl. No. 12/640,837.
PCT; International Preliminary Report on Patentability dated Dec. 6, 2011 in Application No. PCT/US2010/052605.
USPTO; Office Action dated Dec. 8, 2011 in U.S. Appl. No. 12/640,550.
USPTO; Office Action dated Feb. 10, 2012 in U.S. Appl. No. 12/640,661.

(56) References Cited

OTHER PUBLICATIONS

PCT; International Preliminary Report on Patentability dated Dec. 14, 2011 in Application No. PCT/US2010/052652.
USPTO; Final Office Action dated Jan. 12, 2012 in U.S. Appl. No. 12/640,716.
USPTO; Office Action dated Jan. 26, 2012 in U.S. Appl. No. 12/640,895.
USPTO; Office Action dated Feb. 2, 2012 in U.S. Appl. No. 12/640,837.
USPTO; Office Action dated Feb. 2, 2012 in U.S. Appl. No. 12/640,977.
International Search Report and Written Opinion dated Oct. 16, 2012 in PCT Application No. PCT/US2012/036722.
International Search Report and Written Opinion dated Oct. 19, 2012 in PCT Application No. PCT/US2012/048578.
International Search Report and Written Opinion dated Oct. 22, 2012 in PCT Application No. PCT/US2012/050851.
USPTO; Final Office Action dated Oct. 17, 2012 in U.S. Appl. No. 12/868,140.
USPTO; Advisory Action dated Nov. 14, 2012 in U.S. Appl. No. 12/640,661.
USPTO; Advisory Action dated Nov. 16, 2012 in U.S. Appl. No. 12/640,932.
USPTO; Final Office Action dated Nov. 23, 2012 in U.S. Appl. No. 12/640,790.
USPTO; Office Action dated Nov. 26, 2012 in U.S. Appl. No. 12/640,615.
USPTO; Office Action dated Dec. 5, 2012 in U.S. Appl. No. 12/862,930.
USPTO; Advisory Action dated Dec. 7, 2012 in U.S. Appl. No. 12/640,895.
USPTO; Office Action dated Dec. 11, 2012 in U.S. Appl. No. 13/194,726.
USPTO; Advisory Action dated Dec. 14, 2012 in U.S. Appl. No. 12/640,550.
USPTO; Final Office Action dated Dec. 20, 2012 in U.S. Appl. No. 12/640,977.
USPTO; Office Action dated Jan. 4, 2013 in U.S. Appl. No. 13/194,712.
USPTO; Final Office Action dated Sep. 29, 2013 in U.S. Appl. No. 12/868,140.
USPTO; Office Action dated Sep. 24, 2013 in U.S. Appl. No. 12/640,661.
USPTO; Final Office Action dated Oct. 11, 2013 in U.S. Appl. No. 12/640,895.
USPTO; Advisory Action dated Oct. 24, 2013 in U.S. Appl. No. 13/194,870.
USPTO; Notice of Allowance dated Oct. 25, 2013 in U.S. Appl. No. 13/230,341.
USPTO; Notice of Allowance dated Oct. 30, 2013 in U.S. Appl. No. 13/230,302.
USPTO; Notice of Allowance dated Oct. 30, 2013 in U.S. Appl. No. 13/230,239.
USPTO; Notice of Allowance dated Nov. 1, 2013 in U.S. Appl. No. 13/230,195.
USPTO; Notice of Allowance dated Nov. 4, 2013 in U.S. Appl. No. 13/230,179.
USPTO; Notice of Allowance dated Nov. 5, 2013 in U.S. Appl. No. 13/230,326.
USPTO; Notice of Allowance dated Nov. 6, 2013 in U.S. Appl. No. 13/230,218.
USPTO; Notice of Allowance dated Nov. 8, 2013 in U.S. Appl. No. 13/230,282.
USPTO; Advisory Action dated Nov. 14, 2013 in U.S. Appl. No. 13/194,258.
USPTO; Advisory Action dated Nov. 14, 2013 in U.S. Appl. No. 13/194,972.
USPTO; Final Office Action dated Nov. 14, 2013 in U.S. Appl. No. 13/194,768.
International Preliminary Report on Patentability dated Nov. 26, 2013 in PCT/US2012/036722.
Extended Search Report dated Nov. 20, 2013 in European Application No. 12190277.9.
Final Office Action dated Jun. 20, 2014 in U.S. Appl. No. 13/194,756.
Final Office Action dated Jul. 3, 2014 in U.S. Appl. No. 12/640,955.
Office Action dated Jul. 7, 2014 in U.S. Appl. No. 12/862,921.
Final Office Action dated Jul. 10, 2014 in U.S. Appl. No. 13/194,648.
Advisory Action dated Jul. 10, 2014 in U.S. Appl. No. 13/113,851.
Office Action dated Jul. 15, 2014 in U.S. Appl. No. 12/640,977.
Final Office Action dated Jul. 18, 2014 in U.S. Appl. No. 13/342,419.
Advisory Action dated Jul. 24, 2014 in U.S. Appl. No. 12/640,661.
Notice of Allowance dated Jul. 24, 2014 in U.S. Appl. No. 13/194,726.
Final Office Action dated Aug. 4, 2014 in U.S. Appl. No. 13/194,882.
Office Action dated Aug. 7, 2014 in U.S. Appl. No. 13/644,171.
Advisory Action dated Aug. 14, 2014 in U.S. Appl. No. 13/194,692.
Supplemental Search Report dated Aug. 18, 2014 in European Application No. 12758986.9.
Office Action dated Aug. 21, 2014 in U.S. Appl. No. 12/640,837.
Advisory Action dated Aug. 28, 2014 in U.S. Appl. No. 13/194,756.
Office Action dated Sep. 2, 2014 in U.S. Appl. No. 12/640,615.
USPTO; Office Action dated Mar. 29, 2013 in U.S. Appl. No. 12/868,140.
USPTO; Office Action dated Apr. 12, 2013 in U.S. Appl. No. 12/640,837.
USPTO; Office Action dated Apr. 12, 2013 in U.S. Appl. No. 13/230,341.
USPTO; Office Action dated Apr. 12, 2013 in U.S. Appl. No. 13/230,302.
USPTO; Office Action dated Apr. 15, 2013 in U.S. Appl. No. 13/644,171.
USPTO; Office Action dated Apr. 19, 2013 in U.S. Appl. No. 13/194,870.
USPTO; Advisory Action dated May 16, 2013 in U.S. Appl. No. 13/194,726.
USPTO; Final Office Action dated May 20, 2013 in U.S. Appl. No. 13/194,712.
USPTO; Office Action dated May 24, 2013 in U.S. Appl. No. 13/229,877.
USPTO; Office Action dated May 28, 2013 in U.S. Appl. No. 13/342,419.
USPTO; Advisory Action dated Jun. 3, 2013 in U.S. Appl. No. 12/862,921.
USPTO; Final Office Action dated Jun. 13, 2013 in U.S. Appl. No. 12/862,930.
USPTO; Office Action dated Jun. 20, 2013 in U.S. Appl. No. 12/640,550.
Bill Camarda, Using Microsoft Word 2002, 2001, Que Publishing, pp. 296-299.
USPTO; Notice of Allowance dated Jul. 9, 2013 in U.S. Appl. No. 13/230,259.
Notice from the European Patent Office dated Oct. 1, 2007 concerning business methods, Official Journal of the EPO, pp. 592-593.
USPTO; Office Action dated Jul. 24, 2013 in U.S. Appl. No. 13/194,768.
USPTO; Advisory Action dated Jul. 31, 2013 in U.S. Appl. No. 13/194,712.
USPTO; Final Office Action dated Aug. 1, 2013 in U.S. Appl. No. 13/230,239.
USPTO; Final Office Action dated Aug. 1, 2013 in U.S. Appl. No. 13/230,195.
USPTO; Final Office Action dated Aug. 1, 2013 in U.S. Appl. No. 13/230,302.
USPTO; Final Office Action dated Aug. 1, 2013 in U.S. Appl. No. 13/230,179.
Extended Search Report dated Aug. 2, 2013 in European Application No. 13165727.2.
USPTO; Final Office Action dated Aug. 2, 2013 in U.S. Appl. No. 13/230,341.
USPTO; Final Office Action dated Aug. 2, 2013 in U.S. Appl. No. 13/230,218.

(56) References Cited

OTHER PUBLICATIONS

USPTO; Final Office Action dated Aug. 2, 2013 in U.S. Appl. No. 13/194,870.
USPTO; Final Office Action dated Aug. 7, 2013 in U.S. Appl. No. 13/230,326.
USPTO; Final Office Action dated Aug. 7, 2013 in U.S. Appl. No. 13/230,282.
USPTO; Final Office Action dated Aug. 9, 2013 in U.S. Appl. No. 13/194,972.
USPTO; Office Action dated Aug. 14, 2013 in U.S. Appl. No. 13/644,171.
USPTO; Office Action dated Aug. 16, 2013 in U.S. Appl. No. 13/194,712.
USPTO; Final Office Action dated Aug. 22, 2013 in U.S. Appl. No. 13/194,258.
USPTO; Advisory Action dated Sep. 6, 2013 in U.S. Appl. No. 12/862,930.
USPTO; Office Action dated Sep. 9, 2013 in U.S. Appl. No. 13/113,851.
USPTO; Final Office Action dated Sep. 12, 2013 in U.S. Appl. No. 12/640,837.
International Preliminary Report on Patentability dated Mar. 20, 2014 in Application No. PCT/US2012/050851.
Advisory Action dated Mar. 20, 2014 in U.S. Appl. No. 12/640,550.
Notice of Allowance dated Mar. 28, 2014 in U.S. Appl. No. 13/194,712.
Office Action dated Apr. 11, 2014 in U.S. Appl. No. 12/640,837.
Notice of Allowance dated Apr. 14, 2014 in U.S. Appl. No. 13/194,258.
Office Action dated Apr. 15, 2014 in U.S. Appl. No. 13/194,726.
Final Office Action dated Apr. 16, 2014 in U.S. Appl. No. 13/113,851.
Final Office Action dated Apr. 29, 2014 in U.S. Appl. No. 12/640,661.
Notice of Allowance dated May 9, 2014 in U.S. Appl. No. 13/194,672.
Notice of Allowance dated May 9, 2014 in U.S. Appl. No. 13/194,870.
Final Office Action dated May 20, 2014 in U.S. Appl. No. 13/644,171.
Office Action dated Jun. 6, 2014 in U.S. Appl. No. 12/868,140.
Final Office Action dated Jun. 6, 2014 in U.S. Appl. No. 13/194,692.
Richard A. Neifeld, "A Macro-Economic Model Providing Patent Valuation and Patent Based Company Financial Indicators", JPTOS, Mar. 2001, pp. 211-222.
Jonathan A. Barney, "Comparative Quality Analysis A Statistical Approach for Rating and Valuing Patent Assets", TheValuation Examiner, Sep./Oct. 2001, pp. 12-20.
Ted Hagelin, "A New Method to Value Intellectual Property", AIPLA Quarterly Journal, vol. 30, No. 3, Summer 2002, pp. 353-403.
Notice of Allowance dated Jun. 10, 2014 in U.S. Appl. No. 12/862,930.
Office Action dated Dec. 19, 2013 in U.S. Appl. No. 12/640,955.
Final Office Action dated Dec. 19, 2013 in U.S. Appl. No. 13/229,877.
International Preliminary Report on Patentability dated Dec. 20, 2013 in PCT/US2012/070457.
Final Office Action dated Dec. 27, 2013 in U.S. Appl. No. 12/640,550.
Office Action dated Dec. 30, 2013 in U.S. Appl. No. 12/640,977.
Office Action dated Jan. 6, 2014 in U.S. Appl. No. 13/342,419.
Office Action dated Feb. 6, 2014 in U.S. Appl. No. 13/194,648.
Advisory Action dated Feb. 12, 2014 in U.S. Appl. No. 12/868,140.
Office Action dated Feb. 13, 2014 in U.S. Appl. No. 13/194,692.
International Preliminary Report on Patentability dated Feb. 13, 2014 in PCT/US2012/048578.
Office Action dated Feb. 24, 2014 in U.S. Appl. No. 13/194,756.
Office Action dated Feb. 24, 2014 in U.S. Appl. No. 13/194,882.
Advisory Action dated Feb. 28, 2014 in U.S. Appl. No. 13/229,877.
Advisory Action dated Mar. 3, 2014 in U.S. Appl. No. 13/194,768.
Supplemental Search Report dated Oct. 20, 2014 in European Application No. 10838052.8.
Search Report dated Nov. 14, 2014 in Singapore Application No. 2012069936.
Extended European Search Report dated Jan. 21, 2015 in European Application No. 12758985.1.
Notice of Allowance dated Dec. 8, 2014 in U.S. Appl. No. 13/194,648.
Office Action dated Jan. 9, 2015 in U.S. Appl. No. 12/640,661.
Final Office Action dated Jan. 13, 2015 in U.S. Appl. No. 12/862,921.
Notice of Allowance dated Jan. 21, 2015 in U.S. Appl. No. 13/194,882.
Notice of Allowance dated Sep. 15, 2014 in U.S. Appl. No. 13/194,692.
Advisory Action dated Sep. 18, 2014 in U.S. Appl. No. 13/194,648.
Advisory Action dated Sep. 24, 2014 in U.S. Appl. No. 12/640,955.
Advisory Action dated Oct. 16, 2014 in U.S. Appl. No. 13/194,882.
Notice of Allowance dated Oct. 17, 2014 in U.S. Appl. No. 13/194,756.
Office Action dated Oct. 27, 2014 in U.S. Appl. No. 12/640,790.
Office Action dated Nov. 10, 2014 in U.S. Appl. No. 12/640,895.
Office Action dated Sep. 12, 2014 in U.S. Appl. No. 12/640,550.
Office Action dated Nov. 14, 2014 in U.S. Appl. No. 13/342,419.
Office Action dated Nov. 24, 2014 in U.S. Appl. No. 12/868,140.
Office Action dated Nov. 10, 2014 in U.S. Appl. No. 12/640,977.
"IT" (Innovation Tournaments Websitet, Wayback Machine Internet Archive pages dated Jun. 13, 2009, <http://web.archive.org/web/20090613042827/http://www.innovationtournaments.com/> accessed Nov. 12, 2014. Book Excerpt from: Terwiesch et al., Innovation Tournaments: Creating and Selecting Exceptional Opportunities. Harvard Business Press, Jan. 2009.
Terwiesch, Christian, and Karl T. Ulrich. Innovation Tournaments: Creating and Selecting Exceptional Opportunities. Harvard Business Press, Jan. 2009. Draft of Apr. 5, 2008. <http://www. eng. uwate rloo .cal-jze leklteach i ng/ syde361 /In novation T ou rna me nts. Complete Book. 29Ap ri 12008. pdf>.
Search Report and Written Opinion dated Feb. 2, 2015 in Singapore Application No. 2012069928.
Office Action dated Mar. 10, 2015 in U.S. Appl. No. 12/640,932.
Extended European Search Report dated Mar. 25, 2015 in European Application No. 12758984.4.
Office Action dated Apr. 13, 2015 in U.S. Appl. No. 13/229,877.
Notice of Allowance dated Apr. 13, 2015 in U.S. Appl. No. 12/862,921.
Office Action dated Apr. 21, 2015 in U.S. Appl. No. 13/644,171.
Final Office Action dated May 20, 2015 in U.S. Appl. No. 12/640,790.
Final Office Action dated Jun. 5, 2015 in U.S. Appl. No. 12/640,895.
Office Action dated Jul. 2, 2015 in U.S. Appl. No. 13/342,419.
Advisory Action dated Jul. 15, 2015 in U.S. Appl. No. 12/640,790.
Examination Report dated Jul. 27, 2015 in Singapore Application No. 2012069928.
Advisory Action dated Oct. 16, 2015 in U.S. Appl. No. 13/644,171.
Advisory Action dated Sep. 10, 2015 in U.S. Appl. No. 12/640,895.
Office Action dated Aug. 6, 2015 in Canadian Application No. 2,848,458.
Final Office Action dated Sep. 11, 2015 in U.S. Appl. No. 12/640,932.
Office Action dated Oct. 6, 2015 in U.S. Appl. No. 12/640,895.

\* cited by examiner

SYSTEM AND METHOD FOR ENABLING PRODUCT DEVELOPMENT

CROSS REFERENCE TO RELATED APPLICATIONS

This application is a continuation-in-part of, and claims the benefit of U.S. Application Ser. No. 12/640,550 entitled "System and Method for Adjusting Intake Based on Intellectual Property Asset Data" filed Dec. 17, 2009, which is hereby incorporated by reference in its entirety.

FIELD OF INVENTION

The present disclosure generally relates to product development, and more particularly, to providing an automated platform to enable product development, design and transactions.

BACKGROUND OF THE INVENTION

The marketplace for intellectual property (IP) assets tends to underperform due to several issues. For example, the marketplace is fragmented and the marketplace generally lacks defined channels for buyers, sellers and service providers to find each other and transact. The marketplace also lacks standardization in that many potential deals either never materialize or are not completed because of a lack of standards, centralized knowledge and best practices. Moreover, many IP transactors (buyers and sellers) lack the tools to accomplish the steps that comprise a successful IP transaction. Attempts to address these fragmentation and standardization issues include trying to consolidate IP transactors within specific industries and creating seller specific solutions. However, these attempts fall short of providing a universal, end-to-end solution.

As such, a long felt need exists for a universal, end-to-end, automated, standards driven IP marketplace solution that is open to all or a subset of IP transactors, regardless of industry, and that provides standardized tools to help IP sellers identify, value and market their IP.

SUMMARY OF THE INVENTION

Methods and systems provide a member of an IP Marketplace (IP owners, buyers, consultants, etc.) with various functionality for facilitating development and commercialization of assets (e.g., digital products and services). In one embodiment, IP Marketplace 115 includes functionality to enable opportunity, product and/or service development, evolution, refinement and funding. This "Start Up Zone" area of IP marketplace may be used by an entity to organize, design, develop, showcase, receive feedback, receive expert advice, construct, fund, market and sell IP such as a digital product or a digital service (collectively, "digital product").

IP Marketplace 115 is configured to facilitate the application of standardized processes to a product development lifecycle (e.g., for an entrepreneur). In an embodiment, information associated with an opportunity may be entered according to a standardized process. For instance, Start Up Zone presents a first question in a template, where the template includes fields which request standardized data for assessing the standardized product. The Start Up Zone receives a response to the first question and the first response is stored in an asset database as standardized data associated with the opportunity. The Start Up Zone determines a second question based at least partially upon the response to the first question.

In an embodiment, based upon this interactive assessment process, the Start Up Zone configures an online portal for the user that provides a plurality of tools to the user. The Start Up Zone may acquire (e.g. via user input) opportunity data such as, for example, a title, a description, a product image, a link to product information. The Start Up Zone may validate the opportunity data based upon predefined rules. The user may perform a digital upload of the digital product to the Start Up Zone.

In various embodiments, the IP Marketplace system provides user and organizational registration and profiling, IP disclosure and approval, valuing and rating of IP assets, merchandising and cataloging, customized searches and IP matching algorithms, referral services, deal negotiation, transaction execution, marketing tools, collaboration tools, IP asset management (e.g., royalty and maintenance fee management), and data collection and reporting.

The IP Marketplace system may provide a template that requests standardized data for characterizing intellectual property (IP) assets. The system receives IP documentation for an IP asset and a portion of the IP documentation includes the standardized data. The IP documentation is validated, and in one embodiment, the system obtains approval from the IP owner of the data collected for the IP asset. A logic engine accesses algorithms and inputs data from both internal and external data sources, then creates a valuation and a rating of the IP asset.

The IP Marketplace generates a summary of the IP asset which includes a marketing document used to market the IP asset to potential buyers. A project is set up for the commercialization of the IP asset and the project may be based upon a standardized workflow for executing an IP transaction. Permissions are associated with the IP documentation and other data stored for an IP asset. The IP Marketplace may enable various levels of permissions to accommodate the complex set of users, data and steps associated with an IP transaction.

In an embodiment, the system receives an inquiry from a buyer that includes requested IP asset attributes. The system matches the request to the IP asset using a proprietary matching algorithm. The system may facilitate consummation of the IP transaction by generating a transaction task list for an asset based upon a standardized IP transaction workflow. The may also track the status of a plurality of tasks that comprise the transaction task list. The system also provides logistical support by providing referrals for service providers (e.g., lawyers, valuation experts, etc.) and by identifying resources such as, for example, meeting rooms that can be accessed by transaction participants. The system further provides comprehensive IP commercialization support by enabling post-transaction activities, such as tracking patent maintenance fee payments and calculating royalty payments.

In an embodiment, a computer-based system receives opportunity data comprising a title, a description and, a product image for a product or a link to product information for a product. The system receives a digital upload comprising the product and validates the opportunity data and/or the product. In an embodiment, the validation may be based upon predefined rules. In response to the validating, the system facilitates access to the product by a first evaluator. The system receives feedback associated with the product and calculates a product score for the product. In an embodiment, the product score is at least partially based upon the feedback.

In one embodiment, a user device receives a first question in an interactive assessment template. The template may include fields which request standardized data for assessing an opportunity. The user device sends a first response to the first question. In an embodiment, the first response indicates that the first user is at least one of an entrepreneur and an inventor. In response to the sending the first response, the user device receives a second question which is determined based at least partially upon the first response to the first question. The user devices sends a second response to the second question and a receiving computer associates the second response with the standardized data. The user device receives access to an online portal, that comprises a plurality of tools for developing at least one of the opportunity and a product associated with the opportunity.

BRIEF DESCRIPTION OF THE DRAWINGS

A more complete understanding of the present inventions may be derived by referring to the detailed description and claims when considered in connection with the Figures, wherein like reference numbers refer to similar elements throughout the Figures, and:

DETAILED DESCRIPTION

Figure 1A:
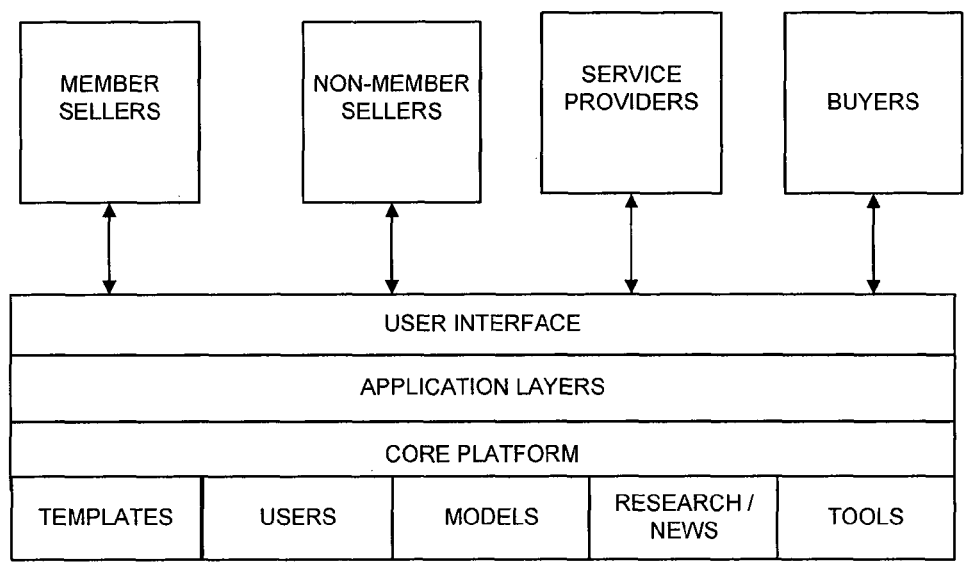
FIG. 1A is a block diagram illustrating a high level conceptual design for enabling an IP marketplace, in accordance with an exemplary embodiment of the present invention.

The systems and methods provide an improved, tangible, integrated, online IP marketplace. An embodiment may be implemented by a system, computer readable medium or a method or any combination thereof. The systems and methods include a unique combination of one or more features associated with an IP marketplace. In one embodiment, the system provides a marketplace for interested buyers and sellers to engage in IP transactions. The system may be implemented as a web-based system that provides a process for managing the marketing and sales process of licensing and commercializing IP assets. A transaction platform (or transaction engine) consolidates the processes necessary for sellers to present their available IP, thereby allowing for a more efficient, standardized process for bringing IP to the market. The system enables a one-stop shopping resource for buyers of IP, providing not only a marketplace for available IP, but centralized access to service providers. In one embodiment, the system facilitates deal negotiation and execution, while also providing search and referral services for IP resources.

Exemplary benefits of the system include providing standardized data, processes, and valuation and rating methods for a product development online portal. The members of the community (e.g., entrepreneurs) benefit by the efficiency and transparency created by this standardization. Sellers are better able to design, develop, market and commercialize products and services and buyers benefit from being able to perform comparative analysis for products and services that are presented in a standardized manner.

An IP marketplace provides new revenue streams to the IP owners by helping to merchandise IP assets. Efficiencies are gained by creating a community of IP owners, industry professionals, sellers and service providers that transact across a common platform.

While the embodiments described herein are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In one embodiment, the system includes a user interface (UI), a software module, logic engines, numerous databases and computer networks. While the system may contemplate upgrades or reconfigurations of existing processing systems, changes to existing databases and system tools are not necessarily required by the system and method.

While the description references specific technologies, hardware, equipment, system architectures and data management techniques, practitioners will appreciate that this description is but one embodiment and that other devices and/or methods may be implemented without departing from the scope of the invention. Similarly, while the description may reference a user interfacing with the system via a personal computer user interface, practitioners will appreciate that other interfaces may include mobile devices, kiosks and handheld devices such as personal digital assistants.

"Entity" may include any individual, consumer, consumer, group, business, organization, entrepreneur, investor, government entity, transaction account issuer or processor (e.g., credit, charge, etc), merchant, consortium of merchants, consumer, account holder, charitable organization, software, hardware, and/or any other entity.

An "account", "account number" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account. The system may include or interface with any of the foregoing accounts or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

A "transaction account" may include any account that may be used to facilitate a financial transaction. A financial institution or transaction account issuer includes any entity that offers transaction account services to consumers. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution, but these participants are not shown.

An "owner," "IP owner," or "seller" may include any entity that owns, owns a majority interest, owns a minority interest, owns any portion, controls, has a right to exploit, or is authorized to convey (e.g., an agent or lawyer) any asset (e.g., an IP asset such as a patent).

A "buyer" may include any entity that purchases goods, services, assets, rights, or IP. For example, a buyer may acquire rights to an IP asset, purchase (via an assignment) an IP asset or may purchase a license to rights associated with an IP asset.

A "financial processor," "payment network," or "payment system" or "transaction account issuer" may include any entity which processes transactions, issues accounts, acquires financial information, settles accounts, conducts dispute resolution regarding accounts, and/or the like.

FIG. 1A shows an embodiment of a high level conceptual design for enabling an IP marketplace. Participants in the online marketplace may include both member and non-member sellers, buyers and service providers. These participants interact with the IP marketplace platform via user interfaces. In various embodiments, the platform may include templates (and logic engines for dynamically creating templates), access to user profiles and history, models (e.g., for valuating and/or rating an IP asset), research tools and access to news.

Figure 1B:
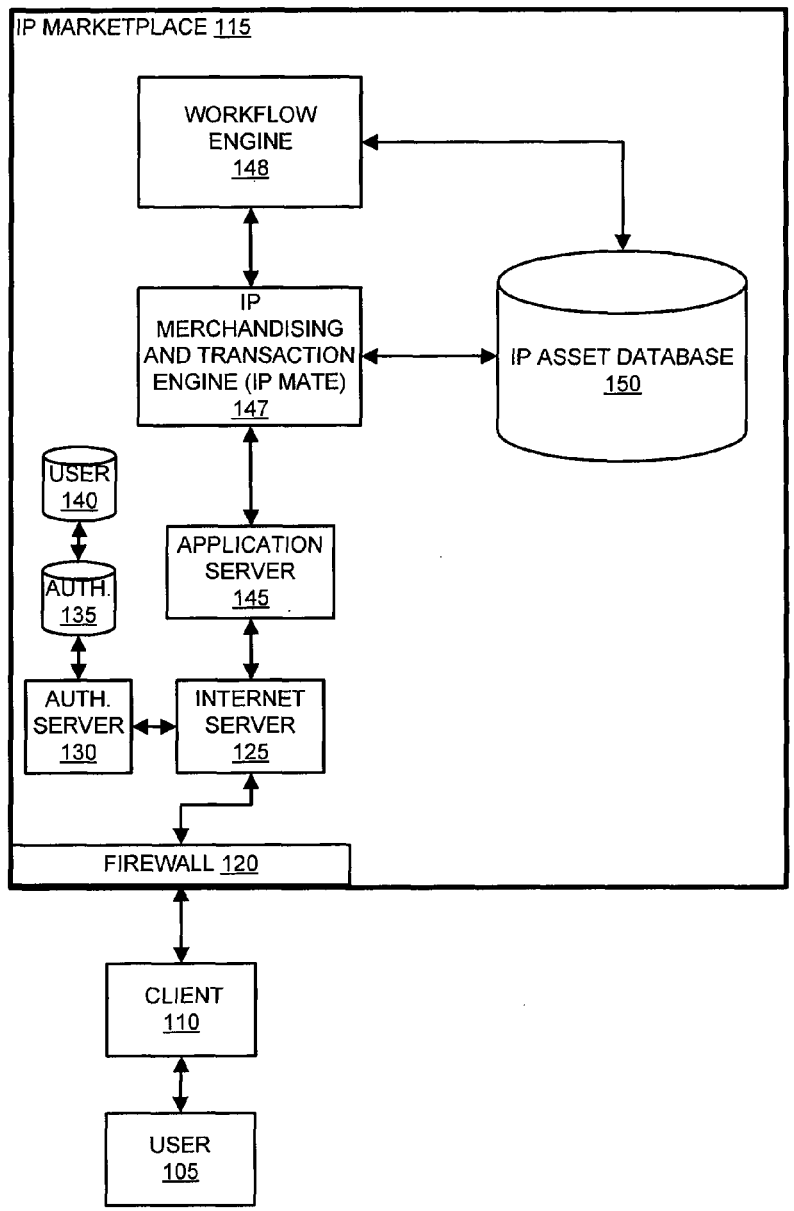
FIG. 1B is a block diagram illustrating major system components for enabling an IP marketplace, in accordance with an exemplary embodiment of the present invention.

With reference now to FIG. 1B, an exemplary block diagram illustrating major system components for enabling an IP marketplace is presented. System 100 facilitates interaction between a user 105 and IP Marketplace 115 through, in one embodiment, client 110 with a network connection to an Internet server 125 by way of the Internet. In one embodiment, Internet server 125 employs authentication server 130 to validate credentials, assign proper permissions, and retrieve preferences information for authorized user's 105 of IP Marketplace 115.

In an embodiment, Internet server 125 employs application server 145 to manage various applications and utilities that are utilized by system 100. In an embodiment application server utilizes APL+Win, and JBOSS utilizing SEAM, Rich-faces JBPM, and other Java libraries (jQuery and Javascript), JAX-WS, Apache POI, and Quartz. In various embodiments, Internet server 125 interacts directly with the various systems and components disclosed herein.

System 100 may include any number of computing platforms and databases such as, for example, IP merchandising and transaction engine (IP MATE) 147, workflow engine 148 and IP asset database 150. Other systems may include, for example, accounting systems, financial transaction systems, reporting systems, new accounts systems, management information systems, business information systems, external data sources, proprietary systems and the like. Each of the systems may be interconnected within by a network in via any method and/or device described herein. A middleware server and/or application server 145 may serve as an intermediary between the various systems to ensure appropriate communications between disparate platforms. A report engine retrieves and/or is provided with data from certain of the various systems in order to generate notices, bills, contracts, messages, audit reports, and the like.

System 100, IP Marketplace 115 and/or any other components discussed herein may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more of the components of system 100 may be embodied as a customization of an existing system, an add-on product, upgraded software, a stand alone system (e.g., kiosk), a distributed system, a method, a data processing system, a device for data processing, a computer and/or a computer program product. Accordingly, individual system 100 components may take the form of an entirely software embodiment, an entirely hardware embodiment, or an embodiment combining aspects of both software and hardware. In one embodiment, a system 100 component (e.g. a computer) may include a processor, a memory, a communications interface, a network interface, etc. Furthermore, individual system 100 components may take the form of a computer program product on a computer-readable storage medium having computer-readable program code means embodied in the storage medium. Any suitable computer-readable storage medium may be utilized, including hard disks, CD-ROM, flash memory, optical storage devices, magnetic storage devices, and/or the like.

The system contemplates uses in association with web services, transaction processing, utility computing, pervasive and individualized computing, security and identity solutions, autonomic computing, commodity computing, mobility and wireless solutions, open source, biometrics, grid computing and/or mesh computing.

User 105 may include any buyer, seller, IP owner, individual, customer, group of individuals, charity, cardholder, business, entity, government organization, software and/or hardware that utilizes system 100 or accesses system 100 functionality. User 105 may include, for example, a potential buyer of IP assets, a full member of the IP marketplace, a partial member, a service provider, etc. User 105 may also include any consumer that has a transaction account with a transaction account issuer. User 105 may also include anyone who applied for the account, currently has the card in her possession, has proxy or other rights to use or maintain the account, is partially or fully responsible to pay the charges on the account and/or the like. User 105 may include a consumer who uses an account code without any physical card, uses a transponder, and/or uses a physical transaction card, to purchase items which are billed on the billing statement discussed herein. In various embodiments, user 105 may interface with IP Marketplace 115 via any communication protocol, device or method discussed herein or known in the art. For example, user 105 may interact with IP Marketplace 115 by way of an Internet browser at client 110.

Client 110 comprises any hardware and/or software suitably configured to facilitate requesting, retrieving, updating, analyzing, entering and/or modifying data. For example, in one embodiment, client 110 is configured to facilitate input, receipt, presentations, analysis and/or review of information relating to IP assets, merchandising of IP assets and facilitating IP transactions. Client 110 includes any device (e.g., personal computer) which communicates (in any manner discussed herein) with IP Marketplace 115 via any network discussed herein. Such browser applications comprise Internet browsing software installed within a computing unit or system to conduct online transactions and/or communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that client 110 may or may not be in direct contact with IP Marketplace 115. For example, client 110 may access the services of IP Marketplace 115 through another server, which may have a direct or indirect connection to Internet server 125. Client 110 may be mobile or may be located in a home or business environment with access to a network. In an exemplary embodiment, access is through a network or the Internet through a commercially-available web-browser software package.

As those skilled in the art will appreciate, client 110 includes an operating system (e.g., Windows NT, 95/98/2000, OS2, UNIX, Linux, Solaris, MacOS, Android, iPhone OS etc.) as well as various conventional support software and drivers typically associated with computers or computing devices. Client 110 may include any suitable personal computer, mobile device, phone, network computer, workstation, minicomputer, mainframe or the like. Client 110 can be in a home or business environment with access to a network. In an exemplary embodiment, access is through a network or the Internet through a commercially available web-browser software package.

Client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Client 110 may include any number of applications, code modules, cookies, and the like to facilitate interaction with IP Marketplace 115 in order to, for example, input data, complete templates/forms, view reports, validate data, approve data, review IP asset info, participate in a negotiation, review due diligence documents, respond to a survey, and the like. In one embodiment, client 110 may store user 105 preferences and/or any other information disclosed herein on a hard drive or any other local memory device. Accordingly, client 110 may retrieve and store consumer information within a memory structure of client 110 in the form of a browser cookie, for example. In another embodiment, client 110 retrieves information relating to user 105 from IP Marketplace 115 on establishing a session with Internet server 125.

In an embodiment, client 110 may be any mobile device which is at least intermittently connectable to a network and configured to run a customizable micro-application (hereinafter "micro-app"). The micro-app is configured, in one embodiment, to receive inputs from a user input and to use the processor and the memory. Client 110 may be a smart-phone, including for example a mobile telephone configured with a Palm mobile operating system, a Windows mobile operating system, an Android Operating System, Apple iOS, a Blackberry operating system and the like, a tablet PC, including for example an iPad, a portable electronic device, including for example a PDA, an iPod Touch, and the like, or any other suitable mobile device. In an embodiment, client 110 may be configured with a user interface which may take the form of a micro-app or any other suitable interface. The micro-app may be configured, for example, to conduct various activities, including, sorting transactions, paying with points, transferring points, applying a credit to a transaction, and/or the like. For example, in an embodiment, the micro-app accesses (via the mobile device) an online portal and receives feedback associated with an opportunity and/or a product.

Firewall 120, as used herein, may comprise any hardware and/or software suitably configured to protect IP Marketplace 115 components from users of other networks. Firewall 120 may reside in varying configurations including stateful inspection, proxy based and packet filtering among others. Firewall 120 may be integrated as software within Internet server 125, any other IP Marketplace 115 components or may reside within another computing device or may take the form of a standalone hardware component. Although depicted as a single firewall in FIG. 1, one skilled in the art will recognize that a firewall or multiple firewalls may be implemented throughout system 100 to enable system and data security.

Internet server 125 may include any hardware and/or software suitably configured to facilitate communications between client 110 and one or more IP Marketplace 115 components. Further, Internet server 125 may be configured to transmit data to client 110 within markup language documents (e.g., XML, HTML, etc.). As used herein, "data" may include encompassing information such as commands, queries, files, data for storage, and/or the like in digital or any other form. Internet server 125 may operate as a single entity in a single physical location or as separate computing components located together or in separate physical locations.

Internet server 125 may provide a suitable web site or other Internet-based graphical user interface which is accessible by consumers. In an embodiment, Internet server 125 employs RedHat Linux Enterprise 5.x Server and Apache Http server. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (e.g. http://yahoo.com/stockquotes/ge) and an IP address (e.g. 123.4.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

In order to control access to components of IP Marketplace 115, Internet server 125 may invoke authentication server 130 in response to user 105 submissions of authentication credentials received at Internet server 125 from client 110. Authentication server 130 may include any hardware and/or software suitably configured to receive authentication credentials, encrypt and decrypt credentials, authenticate credentials, and grant access rights according to privileges (e.g., pre-defined privileges) attached to the credentials. Authentication server 130 may grant varying degrees of application and data level access to users based on information stored within a database and/or any other known memory structure.

IP MATE 147 comprises hardware and/or software modules that execute processes, access data from IP asset database 150 and interact with workflow engine 148 to enable the functionality of IP Marketplace 115.

Workflow engine 148 comprises hardware and/or software modules that implement process definition, tracking and execution. Workflow engine 148 may comprise one or more software applications, modules or data objects. The software may be any executable code written in any software programming language, such as, for example Java®. For example, workflow engine 148 reads data from IP asset database 150 and instantiates a data object (e.g. a Java Bean®) to store the data for use by software modules or other objects. In one embodiment, workflow engine 148 executes an automated or partially automated process such as a price negotiation or an auction. In an embodiment, workflow engine 148 enables users 105 to document a process and track progress toward completion of the process. Workflow engine 145 reads schedules, sends notices and triggers report creation.

IP asset database 150 may include any hardware and/or software suitably configured to facilitate storing data relating to, for example, IP assets, legal documents, marketing documents, tracking and status data, schedules, transactions, statements, amounts owed, payments, authentication credentials, user permissions, consumer preferences, and the like. In one embodiment IP asset database 150 stores standardized templates and stores IP asset data submitted in standardized form and divided or parsed into separate data (e.g., data elements or attributes).

One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 100 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system 100 includes any of various suitable security features, such as firewalls, access codes, encryption, decryption, compression, decompression, and/or the like.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards And Protocols (1998); Java 2 Complete, various authors, (Sybex 1999); Deborah Ray And Eric Ray, Mastering Html 4.0 (1997); and Loshin, TCP/IP Clearly Explained (1997) and David Gourley and Brian Totty, HTTP, The Definitive Guide (2002), the contents of which are hereby incorporated by reference.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices.

Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Software elements (e.g., modules, engines, etc) may be implemented as a web service. In an embodiment, web services are implemented using Webservice Interoperability Organization Basic Profile 1.1.

Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory (or "computer-readable medium") that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

System 100 enables user 105 (e.g., an IP marketplace participant such as an IP owner or a potential buyer), to buy, sell, search for, catalogue, disclose, negotiate, package, license, etc. IP assets. System 100 combines unique standardization, process improvement, workflow, data integration, searching, and data security features to enable a seamless, feature-rich IP marketplace. While certain embodiments of the present invention are disclosed herein in terms of a patent, practitioners will appreciate that the teachings of the present invention may be equally applicable interchangeably between any type of intellectual property including, for example: trade marks, trade dress, know how, trade secrets, copyrights, etc. Furthermore, while transactions may be disclosed herein in terms of a sale (or assignment) of IP assets, practitioners will appreciate that the present invention enables any type of IP transaction such as a grant of partial rights, an exclusive license, a non-exclusive license, a sublicense, a settlement agreement, etc.

Referring again to FIG. 1, in one embodiment, when user 105 logs onto an application, Internet server 125 may invoke an application server 145. Application server 145 invokes logic in the IP MATE 147 by passing parameters relating to the user's 105 requests for data. IP Marketplace 115 manages requests for data from IP MATE 147 and communicates with system 101 components. Transmissions between user 105 and Internet server 125 may pass through a firewall 120 to help ensure the integrity of IP Marketplace 115 components. Practitioners will appreciate that the invention may incorporate any number of security schemes or none at all. In one embodiment, Internet server 125 receives requests from client 110 and interacts with various other system 100 components to perform tasks related to requests from client 110.

Internet server 125 may invoke an authentication server 130 to verify the identity of user 105 and assign roles, access rights and/or permissions to user 105. In order to control access to the application server 145 or any other component of IP Marketplace 115, Internet server 125 may invoke an authentication server 130 in response to user 105 submissions of authentication credentials received at Internet server 125. When a request to access system 100 is received from Internet server 125, Internet server 125 determines if authentication is required and transmits a prompt to client 110. User 105 enters authentication data at client 110, which transmits the authentication data to Internet server 125. Internet server 125 passes the authentication data to authentication server which queries the user database 140 for corresponding credentials. When user 105 is authenticated, user 105 may access various applications and their corresponding data sources.

Figure 2:
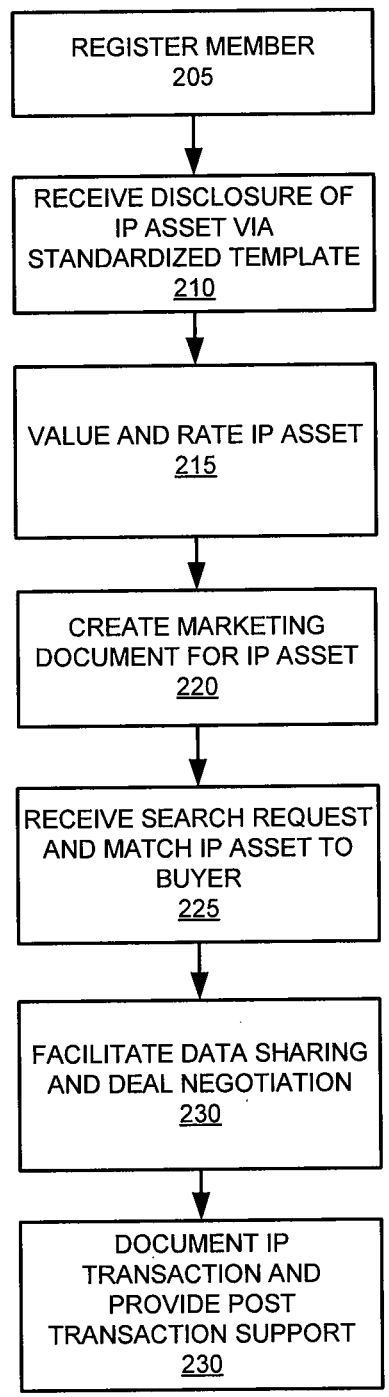
FIG. 2 is a flow chart illustrating an exemplary process for enabling IP commercialization, in accordance with an exemplary embodiment of the present invention.
Figure 3:
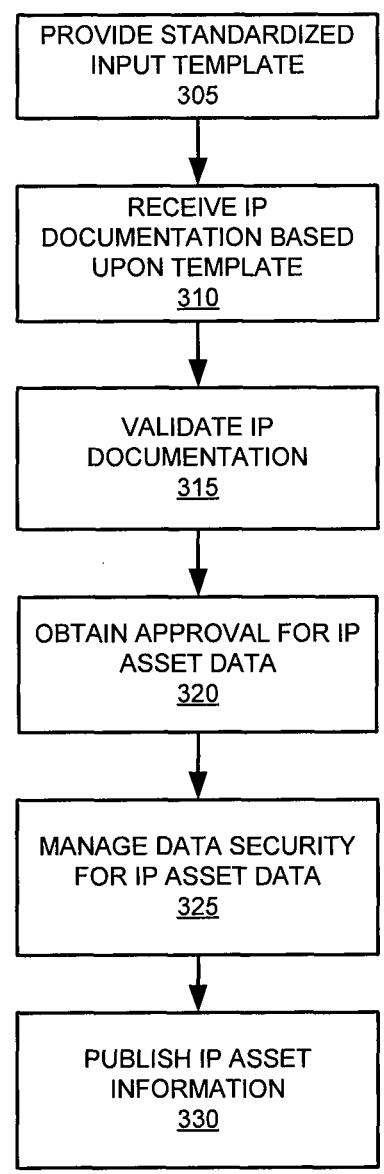
FIG. 3 is a flow chart illustrating an exemplary process for disclosing IP asset information, in accordance with an exemplary embodiment of the present invention.

IP Marketplace 115 enables a standards based, workflow driven, IP commercialization process. With reference now to FIG. 2, in various embodiments, IP Marketplace 115 includes user and organizational registration and profiling (step 205), IP disclosure and approval (step 210), valuing and rating of IP assets (step 215), merchandising and cataloging (step 220), customized search and IP matching algorithms (step 225), referral services, deal negotiation (step 230), transaction execution, marketing tools, collaboration tools, IP asset management (e.g., royalty and maintenance fee management) (step 230), and data collection and reporting.

In an embodiment, users 105 (i.e., "members") are registered as IP owners, customers interested in obtaining the rights to IP and/or service entities (e.g., lawyers, bankers, accountants, technology partners etc.). IP Marketplace 115 also allows licensed partners the right (e.g., within certain geographic regions) to offer, negotiate and consummate membership agreements and the like, for participants to transact on and use the site. In the event a buyer is interested in obtaining the rights to any IP asset, it is the responsibility of the IP owner to invite any relevant registered members to the deal phase. Once the deal phase is complete, it is once again the responsibility of the IP owner to remove all access, and if required, remove any related data.

In an embodiment, IP Marketplace 115 enables collecting and validating IP asset data. A user 105 logs in to IP Marketplace 115 and indicates the desire to enter information regarding an IP asset. IP MATE 147, in conjunction with IP asset database 150 and workflow engine 148, determines a template that will be used to collect standardized information regarding the IP asset. "Standardized", as used herein, may include a template that includes one or more common questions or information requests from multiple users. In an embodiment, the template is a standardized disclosure questionnaire. The template can be standardized based upon various factors such as, for example, industry, technology, type of IP asset, contemplated transaction (e.g., license or sale) or seller of the IP asset. In one embodiment, IP Marketplace 115 enables commercialization of any type of IP asset including patent, trademarks, trade dress, copyrights, trade secrets and know-how.

For instance, IP MATE 147 may determine a standard set of questions for the template based on an indication by user 105 that the IP asset involves computer software for the financial industry and may also determine additional questions based upon a company profile which is stored in IP asset database (or other IP Marketplace 115 databases). The company profile may include company standards (e.g., business rules and formats) for collecting information for IP assets of the company. In an embodiment, IP MATE 147 may determine a standard template for collection IP asset information based upon best practices that are automatically generated and refined by IP Marketplace 115. For example, the beset practices may be developed based upon previous transactions, user feedback, industry standards, etc.

IP Marketplace 115 provides (e.g., via client 110), the standardized template for characterizing the IP asset (Step 305). In one embodiment, the standardized template comprises a survey tool that each IP owner registered on IP Marketplace 115 and it can be customized as to what questions are included in the survey. Thus, the data input can be controlled at an account (IP owner) level. One skilled in the art will recognize that the standardized template may be a single form, multiple forms, multiple input screens, requests to upload documents, new or revised questions based upon responses to previous questions, etc. For example, in one embodiment, providing the standardized template includes formatting an HTML based form comprising a plurality of questions and receiving a plurality of responses. In an embodiment, IP MATE 147 determines a second question based upon the response received from a first question. IP MATE 147 evaluates the response to the first question and may perform an analysis comprising database searches or pattern matching to determine relevance to previous transactions or to existing IP assets in a company's IP asset inventory. IP MATE 147 formulates the second question (or series of second questions) based upon the analysis.

IP Marketplace 115 receives responses based upon the standardized template (Step 310). The responses include IP documentation (forms, documents, data, etc) for an IP asset. In an embodiment, at least a portion of the IP documentation received from user 105 regarding an IP asset is in standardized form. In an embodiment, upon IP MATE 147 invokes logic to parse a portion of the documentation into data elements. In an embodiment, the parsing process may include decrypting the IP documentation and/or encrypting the IP asset data elements.

As part of a parsing process, IP MATE 147 may also characterize the data to form individual attributes describing the IP asset. IP MATE 147 validates the IP documentation (Step 315). Similar to the various methods (e.g., as described above) of standardizing input via a template, IP MATE 147 may employ various methods and/or draw from a variety of sources to validate the IP documentation. For example, in an embodiment, IP documentation may be submitted via a company proprietary input template and IP MATE 147 may parse the submitted documentation into data elements and validate the data elements against validation rules that are standardized for IP Marketplace 115. In other words, in one embodiment, the data validation process executed by IP MATE 147 enables IP Marketplace 115 to allow an IP owner (e.g., a company) to collect IP asset documentation based upon a company standard and enforce general standardization of the data by checking certain standards for data completeness, valid values, etc.

The validation process may include a process of resolving data discrepancies. For example, IP MATE 147 may detect that a certain data field, that may not have been required by a company template, may be required or desired for the standard cataloging of the IP asset. In order to resolve this data discrepancy, IP MATE 147 may determine a default value and assign it to the IP asset and/or IP MATE 147 may invoke workflow engine 148 to generate a series of tasks aimed at resolving the discrepancy.

IP MATE 147 sends an authorization request for the IP asset. In various embodiments, IP MATE 147 may format a report, send the originally submitted IP documentation, and/or send a message to log in to IP Marketplace 115 to review the IP asset data. Similar to processes for resolving data discrepancies, IP MATE 147 may also use workflow engine 148 to generate a workplan (a step or series of steps) for obtaining IP owner approval for the IP asset. For instance, in an embodiment workflow engine 148 reads IP asset database 150 to determine whether the IP owner has a custom approval process. Based upon the custom approval process, workflow engine 148 creates a series of steps (or tasks) to track and execute the approval process. For example, workflow engine 148 may send a message to a number of approvers and then track whether each approver has signed off on the IP asset data. IP MATE 147 determines when the approval process is complete (e.g., electronic approvals received from all approving personnel) (Step 320). As discussed in more detail below, IP MATE 147 manages the data security (e.g., user permissions) for the IP documentation (step 325) and publishes the IP asset information based upon data security considerations (step 330).

In an embodiment, IP Marketplace 115 enables project management functionality. A project overview data structure summarizes the IP asset that user 105 (e.g., an IP owner) is considering for license/sale. IP MATE 147 invokes workflow engine 148 and accesses IP asset database 150 to determine a set of tasks related to states of the IP asset commercialization project. As discussed briefly above, the tasks involved may include approving the IP documentation submitted, valuing and rating the IP asset, creating a marketing package (e.g., information sheets, brochures, demonstrations, etc) for the IP asset, cataloging the IP asset to systematically package (e.g., combine assets into a portfolio) and characterize the IP (by industry, index, subject matter, etc) to prepare it for potential sale, and managing data access permissions for users 105 (e.g., a potential buyer) wishing to receive additional information regarding the IP asset.

IP asset IP Marketplace 115 enables marketing IP assets via the interne and management of the contract process for the purpose of selling IP rights. In an embodiment, data stored in IP asset database 150 may be deemed as public due to the fact that such data may be published for the purpose of selling IP. IP Marketplace 115 enables both open access publishing and controlled publishing. In embodiment, a user 105 authorizes controlled publishing of IP asset data, i.e., only invited users will are able to access the data. In one embodiment, the data stored during a contract negotiations phase is considered restricted. If the negotiations for a transaction are unsuccessful, then the specific data may be deleted (or archived) from the system by user 105. The secure and authorized access to data on the platform is enabled by workflow engine 148 and processes defined in IP asset database 150. IP MATE 147 includes robust user and permissions logic. In an embodiment, upon receipt of a data request, permissions are verified by IP MATE 147 and/or a web-service invoked by IP Marketplace 115. Thus, IP Marketplace enables security such that the users that created the data can grant access to other users.

In one embodiment, IP MATE 147 enforces two requirements for granting access to data. First, IP MATE 147 ensures that the requesting user 105 is associated with the IP owner (e.g., company associated with the asset) or is associated with network of confirmed associates of the IP owner. Secondly, a user 105 that created the data explicitly grants access to anyone in their network to the module of the application for which the data was created. In this manner, confidentiality is the responsibility of the user/owner. In an embodiment, the IP owner has full access to delete files, can remove any other user's access, and can make a project inactive, so that no one has access. In an embodiment, backup data is updated during incremental backup procedures so that once deleted, it is also deleted on the backup memory.

IP Marketplace 115 enables merchandizing of an IP asset. In an embodiment, IP Marketplace 115 receives IP documentation for an IP asset. In an embodiment, at least a portion of the IP documentation is in a standardized format based upon a standardized template. IP MATE 147 determines, based upon the IP documentation, a category for the IP asset. In an embodiment multiple categorizations may be made by IP MATE 147. IP MATE 147 may also determine an industry and assign a unique identifier (e.g., serial number) for the IP asset. IP MATE 147 creates a marketing document (e.g., a fact/information sheet, brochure, etc.) based upon the IP documentation. In various embodiments, the marketing document may be standardized based upon, for example, the type of IP, industry, IP owner, associated technologies and/or anticipated market or buyers for the IP asset. The marketing document may include a valuation and/or a rating of the IP asset. In an embodiment, IP Marketplace 115 allows an IP owner to group IP assets together create an IP portfolio and marketing documents associated with the IP portfolio.

IP MATE 147 stores the marketing document in IP asset database 150. As discussed in detail above, the marketing document may be published to any user (open access publishing) of IP Marketplace 115, or IP Marketplace 115 may limit access to authorized users (controlled access publishing). In an embodiment, IP Marketplace 115 requests approval of the marketing document by the IP owner regardless of how the marketing document will be published. The approval may be based upon a company specific approval processes a default process or a combination. Workflow engine 148 controls and tracks the approval process. In an embodiment, the approval process is iterative and interactive; for example, the IP owner may modify format and content of the marketing document during the approval process. In an embodiment IP MATE 147 invokes logic to publish the marketing document and other data associated with the IP asset. In an embodiment, workflow engine 148 reads the work plan associated with commercializing the IP asset and performs other tasks such as activating the IP asset to be included for consideration by a matching algorithm that matches buyer requirements with IP assets.

In an embodiment, IP Marketplace 115 includes a user interface enabling an IP owner to easily manage IP assets listed on the marketplace and track the assets' progress towards commercialization. User 105 is presented with a dashboard showing the user's "commercialization projects", any associated files (e.g., IP documentation, term sheets, ratings, etc) and tasks. The dashboard also presents a list of contacts to create a network related by working relationships that consist of other users (internal or service providers) that have been selected by the user. The ability to create a customized network of contacts not only gives the user complete control of collaboration, it also allows complete control over sharing project information.

In one embodiment, IP MATE 147 executes processes to value and rate an IP asset. IP MATE 147 retrieves IP asset data associated with the IP asset. In an embodiment, the IP asset data is comprised of data elements and each data element corresponds to an IP attribute. Based upon a variety of factors, IP MATE 147 may determine a plurality of IP attributes to retrieve for the IP asset. For instance the plurality of attributes may be determined based upon a rating method, a valuation process, the inputs to a valuation model (e.g., valuation algorithm), the IP asset type, the IP owner, a country granting an IP right associated with the IP asset, the industry, the technology associated with the IP asset, etc. IP MATE 147 uses the IP asset data retrieved from IP asset database 150 to determine a rating and a value for the IP asset.

IP Marketplace 147 may provide standardized ratings using a number of rating methods. In an embodiment IP MATE 147 rates an IP asset based at least partially upon a comparison to at a market portfolio and/an an internal portfolio. For example IP MATE 147 may determine the internal portfolio by accessing IP asset information stored on IP asset database 150, determining a plurality of similar IP assets, and comparing attributes of the plurality of similar IP assets to the IP asset data for the IP asset being rated. In an embodiment, IP MATE 147 may determine a market portfolio by accessing an external data source, accessing a market analysis and/or obtaining an expert opinion. Ratings may be based upon an evaluation by an industry association, by experts, the reputation of an inventor associated with the IP asset and/or the reputation of the owner of the IP asset. In an embodiment, IP Marketplace 115 enables polling (e.g., via an online survey) other marketplace participants to determine reputation of an inventor and/or an IP owner.

As one of skill in the art will recognize, valuing an IP asset may comprise a variety of calculations, forecasts, comparisons, analysis, etc. For instance, the value of a patent may be based upon determining whether any third party has, or may claim title to, the patent (e.g., if an inventor that did not properly assign the patent rights). Thus, the value of a patent may depend on a title search and clean title history of the ownership rights of the patent. IP MATE 147 may perform numerous valuations of an IP asset based upon, for example, an industry standard valuation model, a valuation model of the owner, a valuation model of a potential buyer, a standard valuation model for the particular technology area, etc.

In an embodiment, IP MATE 147 performs valuation models based upon historical comparables. Values may be determined based upon comparable transactions. The data for the comparable transaction may come from external data sources (e.g., the internet, other IP transaction databases), from historical transaction data stored on IP asset database 150, or from a combination of the two. The valuation may be based upon a cost valuation and a utility valuation. The value may also be a range of values. In an embodiment, IP MATE 147 may individually value a number of IP assets that have been grouped into a portfolio and may also determine a value of the portfolio based upon, for example, the strategic significance of obtaining ownership rights to all the IP assets in the portfolio.

In one embodiment, IP Marketplace 115 determines factors associated with patent quality and produces a valuation based upon the factors. IP Marketplace 115 retrieves IP asset data from IP asset database 150, determines a plurality of factors associated with the value of the IP asset and determines, based at least partially upon the IP asset data, a valuation of the IP asset. IP Marketplace 115 may obtain patent data from a government data source associated with a government authority such as the United States Patent and Trademark Office ("USPTO"), the European Patent Office or a foreign patent governing authority. IP Marketplace 115 may, for example: determine whether the inventorship on an inventor declaration is consistent with the inventorship on an application data sheet; determine whether the inventorship on an assignment document is consistent with the inventorship on an assignment document; audit a chain of title associated with the patent; determine whether maintenance fees associated with the patent are up-to-date; determine whether a claim of invalidity against the patent exists; determine whether a request for reexamination of the patent exists; identify litigation associated with the patent; determine a remaining period before the patent expires; identify licenses associated with the patent; identifying the rights granted in the licenses associated with the patent; determine, based upon patent rules of a country associated with issuing the patent, whether the claims of the patent can be amended; determine whether a duty of disclosure has been met for the patent; determine whether an information disclosure statement of the patent is cross-referenced in the file history of all patents related to the patent; determine whether a related patent application may be filed claiming priority to the patent; and/or determine whether an interference proceeding associated with a patent application was initiated, wherein the patent is the patent application.

In an embodiment, IP Marketplace 115 receives an inquiry from a user 105 (e.g., a potential buyer). The inquiry comprises a requested IP asset attributes such as price range, technology, time remaining on patent, countries/jurisdictions where the IP asset enjoys protection, number of related patents, etc. IP MATE 147 determines a match between the IP asset and the requested IP asset attributes and identifies the IP asset to the buyer. IP MATE 147 may search for matches on IP asset database 150 (internal search) or may search external data sources such as, for example, the Internet, proprietary databases, subscription databases and corporate databases. As such, IP Marketplace 115 may provide comprehensive matching of all available IP assets that a potential buyer may be interested in.

In an embodiment, IP MATE 147 creates a list of available IP assets that match the requested IP attributes and provides the list to user 105. The list presented to user 105 may show the IP asset marketing data, a category, a subject matter associated with the IP asset, an industry associated with the IP asset and a unique identifier associated with the IP asset. In an embodiment, user 105 may select an IP asset from the list of IP assets and IP MATE 147 creates a response providing more data about the selected IP asset. For example, the additional data may comprise the marketing document, a rating, a valuation, contact information of the seller, etc. In an embodiment, the marketing document is in a markup language format and a web page is dynamically created based at least partially upon data in the IP asset database.

Not only does IP Marketplace 115 enable an IP owner to merchandize and catalogue an IP asset, but it also facilitates a complete IP transaction process. In an embodiment, IP Marketplace 115 receives, from a buyer, an inquiry comprising requested IP asset attributes, matches an IP asset and the requested IP asset attributes and identifies the IP asset to the buyer. In one embodiment, a buyer indicates interest in purchasing or licensing the IP asset and IP MATE 147 creates a "deal room" on IP Marketplace 115. The deal room is a virtual space, or data area on IP Marketplace 115 that may be dedicated to a specific IP transaction. The IP owner may invite a potential buyer (or potential licensee's) into the data room to share data, tasks and milestones in an effort to streamline the deal making process. Thus, in an embodiment, the deal room enforces data permissions that may be specific to the IP transaction or to the users authorized to access the deal room.

In an embodiment, IP Marketplace 115 receives a due diligence (DD) request from the buyer for additional data on the IP asset that is being considered for a transaction. In response to the DD request, IP MATE 147 may automatically create (e.g., by allocating memory, creating custom interfaces, assigning permissions, etc.) the deal room and send a approval request to the IP owner to allow the buyer access to the deal room. In one embodiment, in response to a DD request, IP MATE 147 sends an approval request directly to the IP owner and, upon approval, sends the requested DD information directly to the buyer. DD information may also be preauthorized for viewing by any buyer that requests it.

IP Marketplace 115 receives a purchase request (or a buy offer) from a buyer. The request may include exact terms or the request may be an indication of a willingness to enter into negotiations. In an embodiment, in response to receiving the purchase request, IP MATE 147 invokes an IP transaction workflow based upon a predefined process. The predefined process may include business rules and process steps and the business rules that are either standardized by IP Marketplace 115 or defined by the buyer, defined by the IP owner, defined by an industry standard, etc. In an embodiment, IP MATE 147 generates, based upon a standardized IP transaction workflow, a transaction task list for a pending transaction associated with the IP asset and tracks the status of a plurality of tasks that comprise the transaction task list.

In an embodiment, the IP transaction workflow dictates the timing with which certain data permissions are activated (and deactivated) for various participants (e.g. buyer, seller, valuation experts, consultants, etc.) in the IP transaction. Thus, in an embodiment, the data permissions profile for a user 105 (or group of users) is associated with multiple levels of data security and the levels are determined at least partially by an IP transaction workflow. For example, IP MATE 147 may determine that the buyer is permitted to view a set of documents (or a level of data) based upon a status of a negotiation between the buyer and an owner of the IP asset, the receipt of a payment (or other document) from the buyer, an approval by an owner of the IP asset, an approval of a licensee of the IP asset, etc.

In an embodiment, IP Marketplace 115 enables the buyer to perform a custom valuation of the IP asset. For example, IP Marketplace 115 receives a request from the buyer for a custom valuation of the IP asset; IP MATE 147 determines the algorithm and data inputs for the custom valuation and performs the custom valuation of the IP asset. In one embodiment, IP Marketplace 115 comprises interfaces and communication functionality to facilitate online negotiation with between participants of an IP transaction. IP Marketplace 115 may also include a scheduler that accesses IP asset database 150 to determine a physical meeting place that may support a "live" meeting between participants of an IP transaction. In an embodiment, membership in the IP Marketplace provides access to resources and facilities associated with the IP Marketplace.

In one embodiment, IP Marketplace 115 facilitates a referral network of service providers. IP asset database 150 includes a directory of service providers and IP Marketplace 115 includes an interface that allows a user 105 to request a service provider. IP MATE 147 may execute an algorithm to determine an appropriate service provider to match with a user 105.

IP Marketplace 115 also supports post-IP transaction activities such as tracking patent or trademark fees and calculating royalty payments. In one embodiment, IP Marketplace 115 obtains transaction data defining an IP licensing transaction, analyzing the transaction data to determine royalty payment terms and facilitates collection of royalty payments based upon the royalty payment terms. The IP transaction data may be retrieved from IP asset database 150 (e.g., if the transaction was facilitated by the marketplace) or may be entered by the IP owner on a user interface provided by IP Marketplace 115. Royalty payment terms may include a payment schedule, a royalty base, a royalty calculation and a royalty report description. Based upon a schedule defined at least partially by the royalty payment terms, IP Marketplace 115 sends a royalty report reminder and/or royalty payment reminder to a licensee. IP Marketplace 115 receives a licensee report associated with the IP licensing transaction. In an embodiment, IP MATE 147 analyzes the licensee report and calculates, based upon the royalty payment terms, at least one of a royalty due amount and a royalty base. IP MATE 147 creates a royalty invoice and IP Marketplace 115 sends the invoice to the licensee. IP Marketplace receives a royalty payment, notifies the IP owner of the royalty payment and, in an embodiment, verifies the amount of the royalty payment. In an embodiment, the royalty payment may be paid using an account the licensee has with IP Marketplace 115. For example, in one embodiment, IP Marketplace 115 includes transaction account functionality and issues transaction accounts to its members. Royalty payments may be made by a licensee via a transaction account and IP Marketplace 115 may debit the licensee's account and credit an IP owner's transaction account.

In an embodiment, IP Marketplace 115 also enables automated audit of data submitted to the system. For example, IP Marketplace 115 performs an automated audit of a licensee report, sends a report based upon the audit and may determine, based IP transaction data, a penalty associated with non-compliance by the licensee. In one embodiment, IP Marketplace facilitates recording an IP transaction by, for example, creating a report based upon the IP licensing transaction and sending the report to a license recording authority.

In one embodiment, IP Marketplace 115 includes membership accounts. IP Marketplace 115 may provide incentives to conduct transactions, or perform other activities via the system. The incentives may include one or more of a lower Annual Percentage Rate (APR) on a transaction account, a discount on the finance charges, a rebate on finance charges, a cash bonus, a cash-back amount, membership reward points, reduced renewal fee, achievement credit toward a future incentive, increased credit line, increased spend line, statement credit, gift vouchers, gifts, special privileges, special access passes (e.g., back-stage pass). The incentives may be selected using a tiered incentive model. In one embodiment, an achievement credit comprises a credit or increment of a balance. In one embodiment, a discount is a reduction in the amount of finance charges accrued (or fees assessed) on the transaction account. A rebate may be a refund and/or credit of a portion of finance charges accrued (or fees assessed) on the transaction account. For example, a rebate may be sent to a customer (or credited to a customer account) several months after criteria for an incentive have been satisfied.

In various embodiments, IP Marketplace 115 may provide the selected incentives to user 105 by updating its internal databases as well as communicating the incentive information to user 105 through various means known in the art. For example, IP Marketplace 115 may adjust future billing statements of user 105, update consumer's 105 transaction account to reflect the incentives that the consumer has accrued, and/or send user 105 incentive related communication in subsequent billing statements or separately via email, facsimile or post.

In one embodiment, IP Marketplace 115 enables commercial transactions involving the exchange of monetary value for goods, services, or other value between remote individuals, such as users of a distributed computer network or Internet users. The present invention also provides remote purchasers with means for making a secure, confidential transfer of funds; means for immediate initiation of shipment by a seller; means for releasing funds to a seller only after approval of the goods, services, or other value received from the seller; means for demonstrating proof of payment; and means for having some level of recourse against a remote seller. More particularly, the invention facilitates commercial transactions by suitably coordinating the transfer of financial tender from a financial account associated with a first party to a financial account associated with a second party in exchange for the transfer of an IP asset, goods, or services from a second party to a first party. Additional details are disclosed in U.S. application Ser. No. 12/242,759 entitled "Systems And Methods For Facilitating Transactions" and filed on Sep. 30, 2008, which is hereby incorporated by reference in its entirety.

In one embodiment, IP Marketplace 115 provides lending services and/or support to lending institution. For instance the buyer of an IP asset may want to use credit to pay for a portion of the IP transaction. IP Marketplace 115 enables a structural risk analysis. Outputs of a total structural risk model can be used in any business or market segment that extends credit or otherwise needs to evaluate the creditworthiness of a particular consumer. As such, the marketplace may facilitate evaluating credit risk and securing credit for its members.

Modeling consumer risk includes, in one embodiment, obtaining consumer data, modeling and/or processing the consumer data, and creating an output. The output may then be used to make business decisions. In various embodiments, the present invention uses a variety of data (e.g., consumer data) in conjunction with several modeling/processing procedures to assess risk.

A debt obligation includes any obligation a consumer has to pay a lender money. Any extension of credit from a lender to a consumer is also considered a debt obligation. A debt obligation may be secured or unsecured. Secured obligations may be secured with either real or personal property. A loan or a credit account are types of debt obligations. A security backed by debt obligations is considered a debt obligation itself. A mortgage includes a loan, typically in the form of a promissory note, secured by real property. The real property may be secured by any legal means, such as, for example, via a mortgage or deed of trust. For convenience, a mortgage is used herein to refer to a loan secured by real property. An automobile loan includes a loan, typically in the form of a promissory note, which is secured by an automobile. For convenience, an automobile loan is used herein to refer to a loan secured by an automobile.

A lender is any person, entity, software and/or hardware that provides lending services. A lender may deal in secured or unsecured debt obligations. A lender may engage in secured debt obligations where either real or personal property acts as collateral. A lender need not originate loans but may hold securities backed by debt obligations. A lender may be only a subunit or subdivision of a larger organization. A mortgage holder includes any person or entity that is entitled to repayment of a mortgage. An automobile loan holder is any person or entity that is entitled to repayment of an automobile loan. As used herein, the terms lender and credit issuer may be used interchangeably. Credit issuers may include financial services companies that issue credit to consumers.

A trade or tradeline includes a credit or charge vehicle typically issued to an individual consumer by a credit grantor. Types of tradelines include, for example, bank loans, credit card accounts, retail cards, personal lines of credit and car loans/leases.

Tradeline data describes the consumer's account status and activity such as, for example, names of companies where the consumer has accounts, dates such accounts were opened, credit limits, types of accounts, balances over a period of time and summary payment histories. Tradeline data is generally available for the vast majority of actual consumers. Tradeline data, however, typically does not include individual transaction data, which is largely unavailable because of consumer privacy protections. Tradeline data may be used to determine both individual and aggregated consumer spending patterns, as described herein.

Internal data is any data a credit issuer possesses or acquires pertaining to a particular consumer. Internal data may be gathered before, during, or after a relationship between the credit issuer and the consumer. Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also for example, transaction vendor/merchant location may include a particular web address, such as a Uniform Resource Locator ("URL"), an email address and/or an Internet Protocol ("IP") address for a vendor/merchant. Transaction vendor/merchant location may also include information gathered from a WHOIS database pertaining to the registration of a particular web or IP address. WHOIS databases include databases that contain data pertaining, to Internet IP address registrations. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Internal data may further comprise closed-loop data and open-loop data. Closed-loop data includes data obtained from a credit issuer's closed-loop transaction system. A closed-loop transaction system includes transaction systems under the control of one party. Closed-loop transaction systems may be used to obtain consumer transactional data. Open-loop data includes data obtained from a credit issuer's open-loop transaction system. An open-loop transaction system includes transaction systems under the control of multiple parties.

Credit bureau data is any data retained by a credit bureau pertaining to a particular consumer. A credit bureau is any organization that collects and/or distributes consumer data. A credit bureau may be a consumer reporting agency. Credit bureaus generally collect financial information pertaining to consumers. Credit bureau data may include consumer account data, credit limits, balances, and payment history. Credit bureau data may include credit bureau scores that reflect a consumer's creditworthiness. Credit bureau scores are developed from data available in a consumer's file, such as the amount of lines of credit, payment performance, balance, and number of tradelines. The data available in a consumer's file is used to model the risk of a consumer over a period of time using statistical regression analysis. In one embodiment, those data elements that are found to be indicative of risk are weighted and combined to determine the credit score. For example, each data element may be given a score, with the final credit score being the sum of the data element scores.

In one embodiment, IP Marketplace 115 determines or accesses consumer information that includes a comprehensive consumer default risk value for a consumer. One method comprises obtaining consumer credit data relating to the consumer, modeling consumer spending pattern of the consumer using the consumer credit data, and calculating the comprehensive consumer default risk value for the consumer based upon the consumer credit data and the consumer spending pattern. In one embodiment, the method includes obtaining internal data relating to the consumer and further calculating comprehensive consumer default risk value for the consumer based upon the internal data. In an embodiment, determining the default risk value of the consumer may also include receiving credit bureau data related to multiple accounts of the consumer and for a previous period of time, identifying balance transfers into, or out of, those accounts, discounting any spending identified for any of the accounts for any portion of the previous period of time in which a balance transfer to such account is identified, and estimating a purchasing ability of the consumer based on the credit bureau data and the discounting.

A method for facilitating earning loyalty points is also part of various embodiments, wherein the loyalty points are associated with a geographic area, and the method includes: receiving purchase data; determining a geographic area related to the purchase data; determining an amount of geographic area loyalty points based on the geographic area information and purchase data; and updating the loyalty account with the geographic area loyalty points. Receiving purchase data may include: receiving and storing manufacturer item identifiers; receiving and processing a consumer ID; receiving and processing purchase data, wherein the purchase data comprises a retailer item identifier; associating at least two of consumer ID, purchase data, and a manufacturer item identifier; and performing an analysis that is dependent upon the step of associating.

The invention also facilitates redeeming loyalty points, wherein the loyalty points are associated with a geographic area, by maintaining a database for storing geographic area loyalty points in a loyalty account corresponding to a participant; receiving a request related to a requested geographic redemption area to redeem an amount of the geographic area loyalty points; determining if the requested geographic redemption area is associated with the geographic area loyalty points; and, adjusting the loyalty account based upon the amount of geographic area loyalty points.

The invention further includes redeeming said geographic area loyalty points in a pre-determined geographic area. The determination of a geographic area may be accomplished by using at least one of: zip codes, retailer identification codes, retailer item identifier, store identifier, warranty data, service establishment codes, SKU codes, UPC manufacturer codes, consumer ID, retailer ID, manufacturer ID, purchaser profile, consumer enrollment data, retailer loyalty identifier, consumer account, aggregate consumer account, consumer profile, supplementary member profile, and third party provider information. Calculating the geographic area loyalty points may include using at least one of a formula, ratio, percentage, consumer level, global positioning system information, point level, retailer level, manufacturer level, and reward level. The method may be implemented by an interactive, online computer system and may further include informing a consumer of the loyalty points in real-time at a point-of-sale, a suggestive sale in a geographic area, pooling, gifting and transferring the geographic area loyalty points or receiving purchase data includes receiving consumer data from a dual use transaction card. More details regarding geographic systems and loyalty point systems which may be incorporated into various embodiments of the present invention are disclosed in U.S. patent application Ser. No. 10/708,570 entitled "Geographic Loyalty System And Method" and filed on Mar. 11, 2004; U.S. patent application Ser. No. 10/304,251 entitled "System And Method For The Transfer Of Loyalty Points" filed on Nov. 26, 2002, U.S. Pat. No. 7,398,225 entitled "System And Method For Networked Loyalty Program" filed on Apr. 17, 2001; and, U.S. Pat. No. 7,398,226 entitled "System And Method For Networked Loyalty Program" filed on Nov. 6, 2001, which are hereby incorporated by reference in their entirety.

IP Marketplace 115 may offer a savings program to its members which creates discounts on transactions at specific, program-enrolled merchants and/or based upon consumer spending. In one embodiment, IP Marketplace 115 enables systematic and automatic discount to consumers when they use their transaction account for payment.

In one embodiment, participants in the IP Marketplace may earn loyalty points, redeem loyalty points, receive advanced loyalty points and receive a cash advance associated with loyalty points. In various embodiments, as discussed above loyalty accounts may be associated with executing a transaction or using a preferred service provider.

An exemplary system and method of the present invention is generally described, in terms of a transaction phase, a transaction authorization and settlement phase, and an account reconciliation phase. During the transaction phase, a loyalty program participant (e.g., a consumer) desiring to spend accumulated loyalty points selects products or services for purchase from an individual merchant or a shopping/redemption network of merchants. For example, in an online transaction, the participant may select a "pay with loyalty points" hyperlink button, thereby invoking a process to convert accumulated loyalty points to some currency value such as a credit to a participant's financial transaction account. After selecting a given product or service to purchase, the participant provides his or her transaction card number and the transaction is processed as with any other transaction. Additionally, in one embodiment, before the transaction is allowed to go forward, the account manager verifies that sufficient credit is available on participant's financial transaction account and/or sufficient loyalty points are available in participant's loyalty account. In this case, a charge authorization system is accessed to compare the transaction details with account information stored in the participant's loyalty account and the participant's transaction account.

During this verification process, the account manager's loyalty system middleware determines the appropriate number of loyalty points to use by implementing a conversion processor that converts the participant's loyalty points to an appropriate currency equivalent (e.g., 100 loyalty points=$1 US). For example, taking into account the 100 to 1 conversation ratio, if the transaction amount is $100.00, the loyalty point equivalent would be 10,000 points. If the participant confirms the use of designated loyalty points to complete the purchase, the participant's loyalty account is reduced by the appropriate number of loyalty points and the merchant proceeds with the transaction authorization and settlement phase to complete the transaction.

During the account reconciliation phase, the accounts receivable system reconciles the charge for the particular transaction with a credit from the participant's loyalty account. In one embodiment, for each charge where the participant selected to pay with loyalty points, there will be a corresponding and offsetting charge to the account. In another embodiment, where the account participant desires to pay only part of the transaction amount with loyalty points, the loyalty credit will only partially offset the merchant charge and the remainder will be paid with the participant's transaction card.

In one embodiment, an account participant is issued a number of advanced loyalty points to facilitate a purchase when a loyalty account balance is not sufficient to complete such a transaction. Using a number of preset rules and criteria, an account manger calculates a number of points available to an account participant as an advance. According to this point advance embodiment, the account participant may subsequently utilize the advanced loyalty points to purchase goods and/or services from the account manger or any merchant that accepts the loyalty points. The user is allotted a period of time for which to earn enough loyalty points to offset the loyalty point advances. If, at the end of the allotted period of time, a balance of advanced loyalty points has not been offset, then the account manager may charge the participant an amount equal to the currency value of the loyalty points at the time of the advance. In one embodiment, to determine the number of loyalty points available for advance, account manager may consider consumer information (e.g., participant and financial account attributes). These attributes may include, for example, the participant's account history, other parties responsible for the participant's account, the length of time the participant has been enrolled in the loyalty program, the product type associated with the loyalty account, the intended use of the points, and/or the like. For example, participants may be classified into tiers according to the type of financial instrument associated with the loyalty account. The available points for advance may also change depending on how quickly a previous advance is replenished, or the available advance points may increase as each previously advanced point is replenished. Practitioners will appreciate that the calculation of loyalty points available for advance may be based on any number of characteristics and variables.

Thus, a loyalty point transaction may include a participant desiring to apply loyalty points to facilitate a particular transaction over a computerized network such as the internet: (1) uses his or her charge card number to make an online purchase, (2) associates the charge card account with a loyalty account; and (3) invokes a process to apply a currency value credit (corresponding to a defined amount of loyalty points) to the participant's designated charge card account. This currency value credit may offset all or part of a corresponding purchase. Therefore, loyalty points are not used to make the purchase, but may be used to offset at least part of a corresponding charge. The integration of the loyalty program and existing transaction (e.g., charge card) account processing systems is undetectable to the merchant in that the merchant may be unaware that the customer is using loyalty points to offset at least part of the charge. Additional embodiments relate to the crediting of a variety of different accounts to facilitate particular transactions. For more information regarding loyalty points and loyalty point advance features, see U.S. application Ser. No. 11/548,203, entitled "System And Method For Issuing And Using A Loyalty Point Advance" and filed on Oct. 10, 2006 which hereby incorporated by reference in its entirety.

In one embodiment, an action on IP Marketplace 115 is associated with a loyalty point advance or a loyalty point cash conversion. The system receives a request from a consumer to exchange loyalty points for a purchase of an IP asset or to pay a service provider. The system issues a loyalty point advance to the loyalty account of the consumer to facilitate the purchase. In one embodiment a desired consumer behavior is associated with accumulating loyalty points, depleting the loyalty point account, closing the loyalty account, closing a second loyalty account, transferring loyalty points from a second loyalty account, or redeeming loyalty points.

In one embodiment, the system may determine a time period during which the consumer may earn loyalty points to offset the loyalty point advance and a positive behavior reward associated with an incentive may involve offsetting at least a portion of the loyalty point advance in response to the determining the desired behavior attribute is satisfied. In one embodiment, the system charges a transaction account associated with the consumer for the amount of the purchase minus the cash value associated with the loyalty point advance. However, in response to determining the desired behavior for an incentive is satisfied, the system may reward the consumer by crediting the transaction account for the cash value associated with the loyalty point advance.

In one embodiment, IP Marketplace 115 includes functionality to enable opportunity, product and/or service development, evolution, refinement and funding. This "Start Up Zone" (not pictured in FIG. 1B) area of IP Marketplace 115 may be used by an entity to organize, design, develop, showcase, receive feedback, receive expert advice, construct, fund, market and sell IP such as a digital product or a digital service (collectively, "digital product"). In an embodiment, IP Marketplace 115 includes a multitude of tools such as, for example, a search tool, a statistical scoring tool, an access configuration tool, an interactive assessment tool, a recommendations tool, a storage tool, a feedback tool, an expert advice tool, a web recording tool, a market research tool, a project management tool, a prototype tool, a demonstration tool, a connect and recommend tool and a mobile alert tool.

A user may access Start Up Zone and its associated tools via an online portal. The tools available to the user at the online portal may be a customized set of tools. For example, the user may configure the online portal by purchasing access to tools from an ala carte menu of tools. IP Marketplace 115 may determine the tools available to the user based upon, for example, a user subscription level, the industry, the type of user, or characteristics of the digital product. For example, IP Marketplace 115 may make available to the user a different set of tools if the digital product is a game, than if the digital product is a business application. Furthermore, in an embodiment, IP Marketplace 115 is configured to facilitate the application of standardized processes to a product development lifecycle (e.g., for an entrepreneur). For example, IP Marketplace may configure a market research tool differently for a user that is developing a high-priced business application, than for a user who is developing a $0.99 app for use on a mobile phone.

The interactive assessment tool enables the application of standardized processes, assessments and evaluations to a product development effort. In one embodiment, the interactive assessment tool is used by Start Up Zone to gather standardized data regarding an opportunity, a project and/or a product or service. The tool is set up with discrete steps in the product development process, such as define target segment, size market, define value proposition. For each step, the tool is pre-defined with a number of questions to help the entrepreneur assess and benchmark the state of product development. The questions are both qualitative and multiple choice in nature. The tool will compute the inputs from the entrepreneur to calibrate within its database and peer universe from other entrepreneur to provide guidance on the state of product development and identify areas where further research/validation would be useful to further enhance likelihood of success.

The search tool allows a user to find experts based upon search criteria. For example, a user may search for an expert based upon the relevance of the expert to a product being developed. In an embodiment, Start Up Zone determines a relevance score for each expert among the plurality of experts and the relevance score is at least partially based upon an industry, a skill set of the expert, a reputation of the expert, a cooperativeness factor, an effectiveness factor, a qualification and/or a location. The score for the expert will incorporate the inputs from the statistical scoring tool, that will calibrate from general web content generated by the expert, level of activities/interactions with the experts on the Startup Zone, and ratings (both in terms of mean and variances) for the expert as well as the level of authority of users providing the ratings within the Startup Zone community. The search tool enables the user to search for the expert based upon the relevance score, or for any of the data upon which the relevance score is based.

The statistical scoring tool enables a user to review and interpret feedback received regarding a digital product and/or an opportunity. The statistical scoring tool may utilize any statistical scoring, forecasting, prediction or simulation method now known or later developed. Feedback may include a score, a rating, an offer to purchase, an offer to invest, a recommendation, a critique, a comparison, verbal advice, written feedback, numerical feedback, etc. The statistical scoring tool will balance the calibration of rankings/ratings in terms or mean, variance, size of universe, and the level of authority of those providing the ratings/rankings within the Startup Zone community.

The access configuration tool enables a user to specify who, when, how and what type of data other users of the Start Up Zone may be able to view about an opportunity or digital product. Permissions are configurable by the user and may be stored at the entity (e.g., user or company) or opportunity (e.g., digital product) level. The Start Up Zone may enable various levels of permissions to accommodate the complex set of users, data and steps associated with a product development effort. For example, a user may wish to grant a technical expert access to technical documentation for a digital product while keeping such data/information hidden from a marketing consultant. Furthermore, an investor who is subject to a non-disclosure agreement (NDA), may be granted full access to all the data stored in IP asset database 150 for a particular digital product.

As discussed previously, the secure and authorized access to data in the Start Up Zone is enabled by workflow engine 148 and processes defined in IP asset database 150. IP MATE 147 includes robust user and permissions logic. In an embodiment, upon receipt of a data request, permissions are verified by IP MATE 147 and/or a web-service invoked by IP Marketplace 115. Permissions may be associated with the IP documentation and other data stored for an IP asset.

The web recording tool enables the recording and storage of data exchanged in the Start Up Zone. For instance, the Start Up Zone may enable a user to access a product design expert via chat or instant messaging functionality. The digital data exchanged may include text, audio (e.g., voice), graphics, video etc. The web recording tool enables a user to record the data offered by the expert. The web recording tool is also configured to allow the user to associate notes, tags and other data to the recorded data, in order to enhance the organization and usability of the recorded data.

The market research tool is an interactive tool that leverages the traditional market research methodologies (e.g. focus group, survey, conjoint analysis) to help entrepreneurs to a) identify which methodology is more appropriate, b) design the study, c) seek inputs from experts regarding design, administration, and analysis; d) interpret study results. The tool will also showcase sample studies and analysis.

The project management tool enables users to schedule, manage, track and/or assign tasks. The tool also enables a user to track milestones, send status reports and receive status reports. In an embodiment, the project management tool includes a facility to draft, review and modify notes regarding various activities, tasks, ideas and events. The tracking of milestones can also be presented to a potential investor or a client.

The prototype tool is specifically designed to help entrepreneurs who have completed the initial steps of product development (such as define segment, size market, define value proposition). This tool will define steps to build a prototype in a systematic fashion (e.g. draft design, design architecture, define generation 1 functionalities, test). Along each step, the tool maps out the "how to" recommendations with features that allow the users to solicit feedback and validation from experts and potential customers.

The demonstration tool will host and present the prototype to potential investors and customers with the milestones from the market research tool, prototype tool, and tournament results. It will allow potential investors and clients to evaluate various prototypes with metrics from the tournament, market research tool and prototype tool with additional context in the product development cycle.

The connect and recommend tool provides social networking functionality in the Start Up Zone. For example, users can search for and connect to each other and send and receive feedback, advice and recommendations from the online community. Users can send links to another user to connect with a member in his/her online network with specific information about the nature of engagement, areas of mutual interest, and provide an introduction for the two parties. The user can also define and solicit the type of members he/she wants to connect with. The tool will recommend members from the online community and the shortest way to connect with these recommended members leveraging the user's existing network of contacts within the Startup Zone.

The mobile alert tool enables an alert to be automatically generated and sent to a user. The alert may comprise an email, a text message, a phone call and/or an indicator on the user's online portal. The mobile alert may be triggered by any event captured by the Start Up Zone. For example, the Start Up Zone recognizes a connection to the user's product page, a download of a product and/or receipt of a recommendation, a score, or feedback. Furthermore, in an embodiment, a mobile alert may be generated by the project management tool (e.g., upon the completion of a task, to alert a scheduled item, etc.).

The Start Up Zone enables a user to enter information regarding an opportunity, such as for example, a digital product. The information may be entered according to a standardized process. For instance, Start Up Zone presents a first question in a template, where the template includes fields which request standardized data for assessing the standardized product. The Start Up Zone receives a response to the first question and the first response is stored in IP asset database 150 as standardized data associated with the opportunity. The Start Up Zone or one of its components (e.g., IP MATE 147) determines a second question based at least partially upon the response to the first question. For instance, the Start Up Zone may determine from the response to the first question that the user is an entrepreneur and formulate a second question in order to determine what stage of the product life cycle the product is in.

In an embodiment, based upon this interactive assessment process, the Start Up Zone configures an online portal for the user that provides a plurality of tools to the user. The Start Up Zone may acquire (e.g. via user input) opportunity data such as, for example, a title, a description, a product image, and/or a link to product information. The Start Up Zone may validate the opportunity data based upon predefined rules. The user may provide a digital upload of the digital product to the Start Up Zone.

The Start Up Zone may also determine based upon the product and/or based upon the interactive assessment process, a standard set of processes for developing the product. The Start Up Zone may create a marketing package, a demonstration or a web page at least partially based upon at least one of the opportunity and the digital product.

The Start Up Zone may receive feedback associated with a product, a project, etc from a user. The user may be, for example, a member of the online community (e.g. an inventor or entrepreneur), a service provider (e.g., a consultant, a lawyer or an expert), a product tester or an investor. The Start Up Zone may also allow a user to request and download a digital product. For example, a user may be a product tester or a potential customer, that downloads a digital product and uses it for a period of time. The user may provide a product evaluation of the product. The Start Up Zone may determine a product score for the digital product. For example, the product score is determined, in one embodiment, based upon a number of downloads of the digital product, a usage duration of the digital product and/or a product evaluation of the digital product.

The Start Up Zone may provide a user with various methods to receive assessments and advice regarding a product, a service, a project, or a task involved with developing any of these. For example, as discussed previously, the Start Up Zone may include a search tool that enables a user to identify an expert and receive feedback from the expert. The expert may be an industry expert, a member of the media, a judge in a product tournament and/or an investor. In an embodiment, choosing an expert that may be relevant to the user is based upon expert rating databases, qualifications, peer ratings, industry knowledge and/or experience. The Start Up Zone may determine a relevance score for the expert. In an embodiment, the relevance score includes an expertise score and a cooperativeness score. The cooperativeness may indicate, for example, how easily others that have relied on the services of the expert were able to contact the expert and/or whether the expert was able to provide relevant and/or timely feedback.

The Start Up Zone may also provide a marketplace for offering expert and/or consulting services and determining a price for those services. For example, pricing for an expert may be a flat rate, a metered (e.g., by the minute) rate or a price determined based upon an auction. In an embodiment, Start Up Zone enables a user (e.g., entrepreneur) to bid on the services of an expert (or a number of experts) and/or have experts bid to provide a service. In various embodiments, an expert may provide feedback in a variety of ways. For example, feedback may include a score, a rating, an offer to purchase, an offer to invest, a recommendation, a critique and/or a comparison. In one embodiment, feedback is given interactively, for example, in an online meeting or chat session.

The Start Up Zone may aid entrepreneurs and/or facilitate the development and identification of desirable or high quality products by conducting a product tournament. In an embodiment, Start Up Zone may identify products eligible for a tournament, while in one embodiment, entrepreneurs may opt-in to a tournament. A plurality of judges may download, use, rate, score and/or provide feedback for a digital product. Tournaments may be scored based upon formal feedback of judges or based upon unstructured feedback of a crowd. For instance, tournaments may be scored based upon a crowd-sourcing feedback model. Tournament judges may also include, for example, investors, industry experts, consumers and an appointed panel.

Tournaments may include one or more rounds. In one embodiment, Start Up Zone determines the score of a digital product for a first round of the tournament. Determining the score may be based upon at least one of a number of downloads of the first digital product, a usage duration of the first digital product, a product evaluation of the first digital product, and/or a ranking of the first digital product. In an embodiment, Start Up Zone applies a predetermined scoring algorithm to aggregate a plurality of scores received from the plurality of tournament judges. For a multi-round tournament, Start Up Zone may determine the winners of the first round and those winners advance to a second round. Prizes may be awarded for participating, scoring above a certain level, advancing to a subsequent round and/or winning a tournament. A prize may include, for example, a credit toward the Start Up Zone online portal and the use of the plurality of tools provided by the Start Up Zone. In one embodiment, a tournament participant may have the opportunity to modify or enhance a product during the tournament. For example, based upon feedback received during the first round of a tournament, a participant may develop a second version of a digital product which will be judged during the second round of the tournament.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" are used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:

1. A computer implemented method comprising:
   presenting, by a computer-based system, a first question in an interactive assessment template, wherein the template includes fields which request standardized data for assessing an opportunity;
   receiving, by the computer-based system and from a first user, a first response to the first question, wherein the first response is part of the standardized data;
   determining, by the computer-based system, a second question based at least partially upon the first response to the first question, Wherein the first response indicates that the first user is at least one of an entrepreneur or an inventor;
   receiving, by the computer-based system, a second response to the second question, wherein the second response is part of the standardized data;
   providing to the first user, by the computer-based system via an online portal and based at least partially upon the standardized data, a plurality of tools for developing at least one of the opportunity or a product associated with the opportunity;
   identifying, by the computer-based system, a target market for the opportunity;
   designing, by the computer-based system, a market research study for the opportunity and the target market;
   creating, by the computer-based system and based on a type of the opportunity, a marketing package for the opportunity;
   presenting, by the computer-based system, the opportunity, the marketing package for the opportunity, and results from the market research study to a potential investor;
   receiving, by the computer-based system, feedback on the opportunity from the investor; and
   transmitting, by the computer-based system and from a mobile alert tool, a mobile alert to the first user in response to the receiving the feedback from the investor.

2. The method of claim 1, wherein, in response the first user being the entrepreneur, the plurality of tools comprises a search tool, an interactive assessment tool, a statistical scoring tool, an access configuration tool, a recommendations tool, a storage tool, a feedback tool, an expert advice tool, a web recording tool, a market research tool, a project management tool, a prototype tool, a demonstration tool, a connect and recommend tool and a mobile alert tool.

3. The method of claim 1, wherein the opportunity comprises at least one of a digital product or a digital service.

4. The method of claim 2, further comprising configuring, by the computer-based system, the online portal with a personalized user interface for the first user, wherein the configuring is based upon at least one of the opportunity, an industry or a user preference.

5. The method of claim 1, further comprising determining, by the computer-based system and based upon the opportunity, a standard set of processes for developing the opportunity.

6. The method of claim 1, further comprising determining, by the computer-based system and based upon the opportunity, a standard set of tools for developing the opportunity, wherein the providing the plurality of tools comprises providing the standardized set of tools.

7. The method of claim 1, further comprising receiving, by the computer-based system, opportunity data, wherein the opportunity data comprises a title, a description and at least one of a product image or a link to product information, wherein the product is associated with the opportunity.

8. The method of claim 7, wherein the receiving the opportunity data comprises, receiving the opportunity data via the online portal and based upon the template.

9. The method of claim 8, further comprising validating, by the computer-based system, the opportunity data based upon predefined rules.

10. The method of claim 9, further comprising, in response the first user being the entrepreneur, receiving, by the computer-based system, a digital upload comprising at least one of a digital product or a digital service.

11. The method of claim 10, further comprising creating, by the computer-based system, a marketing package based upon at least one of the opportunity or the digital product and receiving, by the computer-based system and from the first user an approval to allow a second user access to at least one of the opportunity data or the marketing package.

12. The method of claim 1, further comprising receiving, by the computer-based system, feedback from a second user, wherein the second user is at least one of a technical expert, an industry expert or the investor.

13. The method of claim 12, further comprising receiving, by the computer-based system and from a second user, a request for the digital product and transmitting the digital product to the second user.

14. The method of claim 13, further comprising receiving, by the computer-based system, a product evaluation of the digital product from the second user.

15. The method of claim 13, further comprising determining, by the computer-based system, a product score for the digital product, wherein the product score is determined based upon at least one of a number of downloads of the digital product, a usage duration of the digital product or a product evaluation of the digital product.

16. The method of claim 1, further comprising:
receiving, by the computer-based system, IP documentation for an IP asset;
validating, by the computer-based system, the IP documentation; and
receiving, by the computer-based system, an IP owner approval of the IP documentation.

17. The method of claim 16, further comprising determining, by the computer-based system and based upon the IP documentation, an IP asset rating of the IP asset.

18. The method of claim 16, wherein the IP asset is associated with the opportunity, wherein the opportunity comprises at least one of a digital product or a digital service.

19. A system comprising:
a processor,
a tangible, non-transitory memory configured to communicate with the processor,
the tangible, non-transitory memory having instructions stored thereon that, in response to execution by the processor, cause the processor to perform operations comprising:
presenting, by the processor, a first question in an interactive assessment template, wherein the template includes fields which request standardized data for assessing an opportunity;
receiving, by the processor and from a first user, a first response to the first question, wherein the first response is part of the standardized data;
determining, by the processor, a second question based at least partially upon the first response to the first question, wherein the first response indicates that the first user is at least one of an entrepreneur and an inventor;
receiving, by the processor, a second response to the second question, wherein the second response is part of the standardized data;
providing to the first user, by the processor via an online portal and based at least partially upon the standardized data, a plurality of tools for developing at least one of the opportunity and a product associated with the opportunity;
identifying, by the processor, a target market for the opportunity;
designing, by the processor, a market research study for the opportunity and the target market;
creating by the processor and based on a type of the opportunity, a marketing package for the opportunity;
presenting, by the processor, the opportunity, the marketing package for the opportunity, and results from the market research study to a potential investor;
receiving, by the processor, feedback on the opportunity from the investor; and
transmitting, by the processor an from a mobile alert tool, a mobile alert to the first user in response to the receiving the feedback from the investor.

20. An article of manufacture including a non-transitory, tangible computer-readable storage medium having instructions stored thereon that, in response to execution by a computer-based system, cause the computer-based system to perform operations comprising:
presenting, by the computer-based system, a first question in an interactive assessment template, wherein the template includes fields which request standardized data for assessing an opportunity;
receiving, by the computer-based system and from a first user, a first response to the first question, wherein the first response is part of the standardized data;
determining, by the computer-based system, a second question based at least partially upon the first response to the first question, wherein the first response indicates that the first user is at least one of an entrepreneur and an inventor;
receiving, by the computer-based system, a second response to the second question, wherein the second response is part of the standardized data;
providing to the first user, by the computer-based system via an online portal and based at least partially upon the standardized data, a plurality of tools for developing at least one of the opportunity and a product associated with the opportunity;
identifying, by the computer-based system, a target market for the opportunity;
designing, by the computer-based system, a market research study for the opportunity and the target market;
creating, by the computer-based system and based on a type of the opportunity, a marketing package for the opportunity;
presenting, by the computer-based system, the marketing package for the opportunity, and results from the market research study to as potential investor;
receiving, by the computer-based system, feedback on the opportunity from the investor; and transmitting, by the computer-based system and from the mobile alert tool, a mobile alert to the first user in response to the receiving the feedback from the investor.

* * * * *